(12) United States Patent  
Campbell

(10) Patent No.: US 10,584,040 B2
(45) Date of Patent: Mar. 10, 2020

(54) FILTER CARTRIDGE

(71) Applicant: WHIRLPOOL CORPORATION, Benton Harbor, MI (US)

(72) Inventor: Christopher M. Campbell, Riverside, CA (US)

(73) Assignee: Whirlpool Corporation, Benton Harbor, MI (US)

( * ) Notice: Subject to any disclaimer, the term of this patent is extended or adjusted under 35 U.S.C. 154(b) by 60 days.

(21) Appl. No.: 15/727,275

(22) Filed: Oct. 6, 2017

(65) Prior Publication Data

US 2019/0106333 A1 Apr. 11, 2019

(51) Int. Cl.
  *B01D 35/30* (2006.01)
  *C02F 9/00* (2006.01)
  *B01D 29/33* (2006.01)
  *B01D 35/147* (2006.01)
  *C02F 1/00* (2006.01)

(52) U.S. Cl.
  CPC .............. *C02F 1/003* (2013.01); *B01D 29/33* (2013.01); *B01D 35/306* (2013.01); *C02F 9/005* (2013.01); *B01D 35/147* (2013.01); *B01D 2201/291* (2013.01); *B01D 2201/4023* (2013.01); *C02F 2201/004* (2013.01); *C02F 2201/006* (2013.01); *C02F 2307/10* (2013.01); *F25D 2323/121* (2013.01)

(58) Field of Classification Search
  CPC ............ B01D 2201/4023; C02F 1/003; C02F 2201/006; C02F 1/001; F25D 2323/121; B01J 23/34

See application file for complete search history.

(56) References Cited

U.S. PATENT DOCUMENTS

| | | | |
|---|---|---|---|
| 1,020,212 | A | 3/1912 | Lukowski |
| 1,814,572 | A | 7/1931 | Shaffer |
| 2,056,756 | A | 10/1936 | Wiedhofft |
| 2,107,165 | A | 2/1938 | Rice |
| 2,158,347 | A | 5/1939 | Yirava |

(Continued)

FOREIGN PATENT DOCUMENTS

| | | |
|---|---|---|
| CA | 2113703 | 1/1994 |
| CA | 2215114 | 10/1996 |

(Continued)

*Primary Examiner* — Ana M Fortuna
(74) *Attorney, Agent, or Firm* — Price Heneveld LLP

(57) ABSTRACT

A filter cartridge for operatively coupling to an appliance interface for treating fluid to the appliance. The filter cartridge includes a cartridge housing and a filter media contained within the cartridge housing. An engagement fitting extends from the cartridge housing. The engagement fitting to be received by the interface. The engagement fitting includes a base portion and a sealing member. The base portion has an inlet aperture on a first side of the sealing member and an outlet aperture on a second side of the sealing member. An interference member actuator extends axially and distally from one of the first end of the cartridge housing and the first end cap. The interference member actuator is configured to actuate an interference member of the interface from an interference position in which the interface is prevented from being actuated from a bypass mode to a filtering mode to a non-interference position.

20 Claims, 11 Drawing Sheets

(56) References Cited

U.S. PATENT DOCUMENTS

| | | |
|---|---|---|
| 2,240,648 A | 5/1941 | Hartman |
| 2,382,278 A | 8/1945 | Widmann |
| 2,544,244 A | 3/1951 | Vokes |
| 2,563,548 A | 8/1951 | Plante |
| 2,568,181 A | 9/1951 | Zimmerman et al. |
| 2,681,572 A | 6/1954 | Lamb |
| 2,790,572 A | 4/1957 | Flaith et al. |
| 2,932,400 A | 4/1960 | Scavuzzo |
| 2,955,712 A | 10/1960 | Janusz |
| 2,979,208 A | 4/1961 | Humbert, Jr. |
| 3,040,894 A | 6/1962 | Pall |
| 3,105,042 A | 9/1963 | Roosa |
| 3,217,942 A | 11/1965 | Humbert, Jr. et al. |
| 3,228,413 A | 1/1966 | Stevens, Jr. |
| 3,237,770 A | 3/1966 | Humbert, Jr. |
| 3,266,628 A | 8/1966 | Price |
| 3,283,907 A | 11/1966 | Whiting |
| 3,306,451 A | 2/1967 | Kudlaty |
| 3,313,417 A | 4/1967 | Rosaen |
| 3,313,418 A | 4/1967 | Rosaen |
| 3,319,791 A | 5/1967 | Home |
| 3,330,098 A | 7/1967 | Delin |
| 3,333,697 A | 8/1967 | Rosaen |
| 3,333,703 A | 8/1967 | Scavuzzo et al. |
| 3,342,340 A | 9/1967 | Shindell |
| 3,347,386 A | 10/1967 | Kraissi, Jr. |
| 3,358,839 A | 12/1967 | Simons |
| 3,360,910 A | 1/1968 | Soltis |
| 3,383,841 A | 5/1968 | Olson et al. |
| 3,388,801 A | 6/1968 | Boyd et al. |
| 3,392,837 A | 7/1968 | Sanzenbacher |
| 3,399,776 A | 9/1968 | Knuth |
| 3,423,908 A | 1/1969 | Hart |
| 3,426,512 A | 2/1969 | Nesher |
| 3,426,998 A | 2/1969 | Kintner |
| 3,434,269 A | 3/1969 | Hyatt |
| 3,447,558 A | 6/1969 | Csemy |
| 3,470,679 A | 10/1969 | Ramsey |
| 3,497,071 A | 2/1970 | Mineo |
| 3,502,214 A | 3/1970 | Mills et al. |
| 3,540,594 A | 11/1970 | Sanderson |
| 3,556,390 A | 1/1971 | Codo |
| 3,557,958 A | 1/1971 | Baldwin |
| 3,640,390 A | 2/1972 | Goy et al. |
| 3,715,032 A | 2/1973 | Nicko |
| 3,729,905 A | 5/1973 | Diccianni |
| 3,746,171 A | 7/1973 | Thomsen |
| 3,774,764 A | 11/1973 | Baldwin |
| 3,777,889 A | 12/1973 | Henderson |
| 3,800,948 A | 4/1974 | LaVallee |
| 3,814,251 A | 6/1974 | Aspinwall et al. |
| 3,852,196 A | 12/1974 | Szpur |
| 3,853,761 A | 12/1974 | McClory |
| 3,855,128 A | 12/1974 | Shaltz et al. |
| 3,859,216 A | 1/1975 | Sisson et al. |
| 3,909,221 A | 9/1975 | Bengtsson et al. |
| 3,950,251 A | 4/1976 | Hiller |
| 3,954,624 A | 5/1976 | Petrucci |
| 3,980,457 A | 9/1976 | Smith |
| 4,046,696 A | 9/1977 | Mouwen |
| 4,051,036 A | 9/1977 | Conrad et al. |
| 4,052,307 A | 10/1977 | Humbert, Jr. |
| 4,077,876 A | 3/1978 | Southall |
| 4,082,673 A | 4/1978 | Cilento |
| 4,094,779 A | 6/1978 | Behman |
| 4,105,561 A | 8/1978 | Domnick |
| 4,172,796 A | 10/1979 | Corder |
| 4,199,443 A | 4/1980 | Tauber |
| 4,204,965 A | 5/1980 | Vincent |
| 4,222,875 A | 9/1980 | Sikula, Jr. |
| 4,268,384 A | 5/1981 | Rosaen et al. |
| 4,271,020 A | 6/1981 | Van Meter |
| 4,299,699 A | 11/1981 | Boogay |
| 4,304,736 A | 12/1981 | McMillin et al. |
| 4,317,725 A | 3/1982 | Kume et al. |
| 4,349,438 A | 9/1982 | Sims |
| 4,371,439 A | 2/1983 | Thomlon |
| 4,379,053 A | 4/1983 | Brane |
| 4,398,562 A | 8/1983 | Saarem et al. |
| 4,434,903 A | 3/1984 | Cooke |
| 4,446,987 A | 5/1984 | White |
| 4,495,072 A | 1/1985 | Fields |
| 4,497,348 A | 2/1985 | Sedam |
| 4,505,823 A | 3/1985 | Klein |
| 4,515,692 A | 5/1985 | Chandler et al. |
| 4,520,950 A | 6/1985 | Jeans |
| 4,529,050 A | 7/1985 | Mosher et al. |
| 4,529,514 A | 7/1985 | Gruett |
| 4,529,515 A | 7/1985 | Selz |
| 4,559,136 A | 12/1985 | Dockery |
| 4,571,953 A | 2/1986 | Caruso |
| 4,601,821 A | 7/1986 | Sherman et al. |
| 4,608,166 A | 8/1986 | Cain |
| 4,615,812 A | 10/1986 | Darling |
| 4,617,118 A | 10/1986 | Smart |
| 4,637,874 A | 1/1987 | Ansteth |
| 4,645,601 A | 2/1987 | Regunathan et al. |
| 4,684,471 A | 8/1987 | Manojlovic |
| 4,719,012 A | 1/1988 | Groezinger et al. |
| 4,731,183 A | 3/1988 | Schumacher, II |
| 4,735,716 A | 4/1988 | Petrucci et al. |
| 4,764,275 A | 8/1988 | Robichaud |
| 4,806,240 A | 2/1989 | Giordano et al. |
| 4,855,041 A | 8/1989 | Church et al. |
| 4,877,521 A | 10/1989 | Petrucci et al. |
| 4,904,382 A | 2/1990 | Thomsen |
| 4,915,831 A | 4/1990 | Taylor |
| 4,935,135 A | 6/1990 | Nakashima et al. |
| 4,948,503 A | 8/1990 | Baumann et al. |
| 4,948,505 A | 8/1990 | Petrucci et al. |
| 4,956,086 A | 9/1990 | Thomsen et al. |
| 4,989,636 A | 2/1991 | Hunter et al. |
| 5,019,251 A | 5/1991 | Sundholm |
| 5,083,442 A | 1/1992 | Vlock |
| 5,098,559 A | 3/1992 | Mack et al. |
| 5,102,543 A | 4/1992 | Burroughs |
| 5,108,598 A | 4/1992 | Posner |
| 5,114,572 A | 5/1992 | Hunter et al. |
| 5,133,382 A | 7/1992 | Nielsen |
| 5,135,645 A | 8/1992 | Sklenak et al. |
| 5,139,050 A | 8/1992 | Otto |
| 5,186,830 A | 2/1993 | Rait |
| 5,256,285 A | 10/1993 | Tomita et al. |
| 5,273,255 A | 12/1993 | Klicek et al. |
| 5,300,223 A | 4/1994 | Wright |
| 5,350,752 A | 6/1994 | Clack et al. |
| 5,336,406 A | 8/1994 | Standford et al. |
| 5,350,506 A | 9/1994 | Dombek et al. |
| 5,354,464 A | 10/1994 | Slovak et al. |
| 5,362,390 A | 11/1994 | Widenhoefer et al. |
| 5,380,432 A | 1/1995 | Brandt |
| 5,397,462 A | 3/1995 | Higashijima et al. |
| 5,397,468 A | 3/1995 | Chomka et al. |
| 5,382,359 A | 7/1995 | Brandt |
| 5,456,830 A | 10/1995 | Stanford et al. |
| 5,460,719 A | 10/1995 | Clack et al. |
| 5,468,386 A | 11/1995 | Ardes |
| 5,486,288 A | 1/1996 | Standford et al. |
| 5,501,791 A | 3/1996 | Theisen et al. |
| 5,503,740 A | 4/1996 | Callaghan et al. |
| 5,516,425 A | 5/1996 | Brieden et al. |
| 5,520,801 A | 5/1996 | Gerber et al. |
| 5,527,451 A | 6/1996 | Hembree et al. |
| 5,560,824 A | 10/1996 | Sann et al. |
| 5,567,310 A | 10/1996 | Nakashima |
| 5,567,311 A | 10/1996 | Jang |
| 5,589,060 A | 12/1996 | Gerbert et al. |
| 5,591,332 A | 1/1997 | Reid et al. |
| 5,607,582 A | 3/1997 | Yamazaki et al. |
| 5,611,923 A | 3/1997 | Suri et al. |
| 5,653,871 A | 8/1997 | Thomsen |
| 5,681,475 A | 10/1997 | Lamensdori et al. |
| 5,688,396 A | 11/1997 | Baumann et al. |
| 5,695,168 A | 12/1997 | Williams |

(56) References Cited

U.S. PATENT DOCUMENTS

| | | |
|---|---|---|
| 5,698,093 A | 12/1997 | Pyle et al. |
| 5,698,098 A | 12/1997 | Ernst et al. |
| 5,700,371 A | 12/1997 | Koslow |
| 5,707,518 A | 1/1998 | Coates et al. |
| 5,715,699 A | 2/1998 | Coates et al. |
| 5,723,255 A | 3/1998 | Texter et al. |
| 5,725,623 A | 3/1998 | Bowerman et al. |
| 5,744,030 A | 4/1998 | Reid et al. |
| 5,753,107 A | 5/1998 | Magnusson et al. |
| 5,753,111 A | 5/1998 | Patton et al. |
| 5,785,848 A | 7/1998 | Strand |
| 5,800,702 A | 9/1998 | Taylor-McCune et al. |
| 5,813,245 A | 9/1998 | Coates et al. |
| 5,826,854 A | 10/1998 | Janvrin et al. |
| 5,846,417 A | 12/1998 | Jiang et al. |
| 5,858,227 A | 1/1999 | Stone et al. |
| 5,863,425 A | 1/1999 | Herichy et al. |
| 5,907,958 A | 6/1999 | Coates et al. |
| 5,914,037 A | 6/1999 | Yen et al. |
| 5,925,025 A | 7/1999 | Weilbacher et al. |
| 5,925,245 A | 7/1999 | Bradford et al. |
| 5,928,504 A | 7/1999 | Hembre et al. |
| 5,947,462 A | 9/1999 | Roussel |
| 6,000,674 A | 12/1999 | Chen |
| 6,024,869 A | 2/2000 | Stifelman |
| 6,027,644 A | 2/2000 | Magnusson et al. |
| 6,068,770 A | 5/2000 | Niermeyer et al. |
| 6,086,752 A | 7/2000 | Dell et al. |
| 6,090,283 A | 7/2000 | Schumann et al. |
| 6,120,685 A | 9/2000 | Carlson et al. |
| 6,129,841 A | 10/2000 | Dann |
| 6,132,176 A | 10/2000 | Higgins |
| 6,139,739 A | 10/2000 | Hamlin et al. |
| 6,193,884 B1 | 2/2001 | Magnusson et al. |
| 6,224,754 B1 | 5/2001 | Schiavon et al. |
| 6,241,132 B1 | 6/2001 | Morrison |
| 6,303,031 B1 | 10/2001 | Senner |
| 6,325,929 B1 | 12/2001 | Bassett |
| 6,337,015 B1 | 1/2002 | Poirier |
| 6,355,177 B2 | 3/2002 | Senner et al. |
| 6,360,764 B1 | 3/2002 | Fritze |
| 6,475,379 B2 | 5/2002 | Jousset et al. |
| 6,409,786 B1 | 6/2002 | Wright et al. |
| 6,423,222 B1 | 7/2002 | Shively et al. |
| 6,458,269 B1 | 10/2002 | Bassett et al. |
| 6,485,643 B2 | 11/2002 | Vardion |
| 6,500,335 B2 | 12/2002 | Janik et al. |
| 6,532,758 B2 | 3/2003 | DuHack |
| 6,579,455 B1 | 6/2003 | Muzik et al. |
| 6,632,355 B2 | 10/2003 | Fritze |
| 6,652,749 B2 | 11/2003 | Stankowski et al. |
| 6,789,691 B2 | 9/2004 | Martin et al. |
| 6,936,084 B2 | 8/2005 | Schlensker et al. |
| 6,977,039 B2 | 12/2005 | Knoll et al. |
| 7,000,894 B2 * | 2/2006 | Olson .................. B01D 35/147 251/149.1 |
| 7,067,054 B2 | 6/2006 | Fritze |
| 7,147,772 B2 | 12/2006 | Fritze |
| 7,147,773 B2 * | 12/2006 | Mitchell .............. B01D 35/153 210/234 |
| 7,326,342 B2 | 2/2008 | Richmond et al. |
| 7,407,148 B2 | 8/2008 | Bassett et al. |
| 7,442,301 B2 | 10/2008 | Huda |
| 7,459,078 B2 | 12/2008 | Klein et al. |
| 7,481,926 B2 | 1/2009 | Dworatzek |
| 7,481,928 B2 | 1/2009 | Fritze |
| 7,610,932 B2 | 11/2009 | Olson et al. |
| 7,638,042 B2 | 12/2009 | Astle et al. |
| 7,695,619 B2 | 4/2010 | Kurth et al. |
| 7,744,758 B2 | 6/2010 | Dworatzek et al. |
| 7,763,170 B2 | 7/2010 | Bassett et al. |
| 7,799,220 B2 | 9/2010 | Fritze |
| 7,900,769 B1 | 3/2011 | Chen |
| 7,909,999 B2 | 3/2011 | Noh et al. |
| 7,955,500 B2 | 6/2011 | Abdalla et al. |
| 7,959,010 B2 | 6/2011 | Hawkins et al. |
| 8,032,422 B2 | 10/2011 | Pickard et al. |
| 8,070,945 B2 | 12/2011 | Stankowski et al. |
| 8,097,061 B2 | 1/2012 | Smith et al. |
| 8,097,156 B2 | 1/2012 | Tubby et al. |
| 8,097,157 B2 | 1/2012 | Tubby et al. |
| 8,097,158 B2 | 1/2012 | Tubby et al. |
| 8,118,997 B2 | 2/2012 | Ebrom et al. |
| 8,137,551 B1 | 3/2012 | Huda et al. |
| 8,236,176 B2 | 8/2012 | Fall et al. |
| 8,245,851 B2 | 8/2012 | Hawkins et al. |
| 8,268,170 B2 | 9/2012 | Core et al. |
| 8,333,818 B2 | 12/2012 | Foerster et al. |
| 8,354,024 B2 | 1/2013 | Ihle et al. |
| 8,356,716 B1 | 1/2013 | Kruckenberg et al. |
| 8,366,930 B2 | 2/2013 | Huda et al. |
| 8,393,167 B2 | 3/2013 | Krause et al. |
| 8,398,853 B2 | 3/2013 | An et al. |
| 8,413,818 B1 | 4/2013 | Kruckenberg et al. |
| 8,442,042 B2 | 5/2013 | McCoy |
| 8,454,826 B2 | 6/2013 | Donnelly et al. |
| 8,562,830 B2 | 10/2013 | Reid |
| 8,580,109 B2 | 11/2013 | Kruckenberg et al. |
| 8,591,736 B2 | 11/2013 | Kruckenberg et al. |
| 8,627,675 B2 | 1/2014 | Kruckenberg et al. |
| 8,673,146 B2 | 3/2014 | Huda et al. |
| 8,709,246 B2 | 4/2014 | Branscomb |
| 8,887,324 B2 | 11/2014 | Klicpera |
| 8,911,623 B2 | 12/2014 | Tubby et al. |
| 8,950,052 B2 | 2/2015 | Kruckenberg et al. |
| 9,044,695 B2 | 6/2015 | Sann et al. |
| 9,061,225 B2 | 6/2015 | Sherman et al. |
| 9,157,677 B2 | 10/2015 | Mitchell |
| 9,211,488 B2 | 12/2015 | South et al. |
| 9,233,322 B1 | 1/2016 | Huda et al. |
| 9,345,995 B2 | 5/2016 | Tubby et al. |
| 9,494,362 B2 | 11/2016 | Lim et al. |
| 9,533,243 B2 | 1/2017 | Kruckenberg et al. |
| 9,687,762 B2 | 6/2017 | Tubby et al. |
| 9,885,445 B2 | 2/2018 | Joung et al. |
| 9,901,852 B2 | 2/2018 | Huda et al. |
| 9,931,589 B2 | 4/2018 | Tubby et al. |
| 9,993,757 B2 | 6/2018 | Joung et al. |
| 10,040,703 B2 | 8/2018 | Huda et al. |
| D831,156 S * | 10/2018 | Campbell .................... D23/209 |
| 2001/0045386 A1 | 11/2001 | Stankowski et al. |
| 2002/0017497 A1 | 2/2002 | Fritze |
| 2002/0020661 A1 | 2/2002 | Jainek |
| 2002/0023614 A1 | 2/2002 | Hartmann et al. |
| 2002/0023863 A1 | 2/2002 | Binder et al. |
| 2002/0036162 A1 | 3/2002 | Magnusson et al. |
| 2002/0043491 A1 | 4/2002 | Janik et al. |
| 2002/0166805 A1 | 11/2002 | Minns et al. |
| 2003/0024860 A1 | 2/2003 | Fritze |
| 2003/0141235 A1 | 7/2003 | Stankowski et al. |
| 2003/0178354 A1 | 9/2003 | Wall |
| 2004/0211717 A1 | 10/2004 | Michell et al. |
| 2004/0211931 A1 | 10/2004 | Olson et al. |
| 2005/0252841 A1 | 11/2005 | Bassett et al. |
| 2006/0060512 A1 | 3/2006 | Astle et al. |
| 2006/0070942 A1 | 4/2006 | An |
| 2006/0169629 A1 | 8/2006 | Donnelly et al. |
| 2006/0191827 A1 | 8/2006 | Fritze |
| 2006/0272995 A1 | 12/2006 | Fritze |
| 2007/0012611 A1 | 1/2007 | An |
| 2007/0227959 A1 | 10/2007 | Sinur et al. |
| 2007/0239461 A1 | 10/2007 | Poninski et al. |
| 2007/0295667 A1 | 12/2007 | Ruprecht |
| 2008/0000820 A1 | 1/2008 | Mitchell |
| 2008/0060982 A1 | 3/2008 | Krause et al. |
| 2008/0078710 A1 | 4/2008 | Larkner |
| 2008/0078723 A1 | 4/2008 | Larkner |
| 2008/0123297 A1 | 5/2008 | Tilton et al. |
| 2008/0185330 A1 | 8/2008 | Sinur et al. |
| 2008/0223775 A1 | 9/2008 | An |
| 2009/0045926 A1 | 2/2009 | Ebrom et al. |
| 2009/0293528 A1 | 12/2009 | Buchstab et al. |
| 2009/0321340 A1 | 12/2009 | Rampen et al. |
| 2010/0018238 A1 | 1/2010 | Gerner et al. |

(56) References Cited

U.S. PATENT DOCUMENTS

| | | | |
|---|---|---|---|
| 2010/0102082 A1 | 4/2010 | Ebrom et al. | |
| 2010/0131082 A1 | 5/2010 | Chandler | |
| 2010/0264078 A1 | 10/2010 | Bassett et al. | |
| 2011/0147297 A1 | 6/2011 | Core et al. | |
| 2011/0174705 A1 | 7/2011 | Branscomb | |
| 2012/0000858 A1 | 1/2012 | Butler et al. | |
| 2012/0145621 A1 | 6/2012 | Tubby et al. | |
| 2013/0068682 A1 | 3/2013 | Kruckenberg et al. | |
| 2013/0068683 A1 | 3/2013 | Kruckenberg et al. | |
| 2013/0068684 A1 | 3/2013 | Kruckenberg et al. | |
| 2014/0138292 A1 | 5/2014 | Kruckenberg et al. | |
| 2014/0144819 A1 | 5/2014 | Verdegan et al. | |
| 2017/0056794 A1 | 3/2017 | Chernov et al. | |
| 2017/0259195 A1 | 9/2017 | Mitchell | |
| 2018/0290083 A1* | 10/2018 | Campbell | B01D 35/153 |
| 2018/0320343 A1* | 11/2018 | Song | B01D 35/04 |

FOREIGN PATENT DOCUMENTS

| | | |
|---|---|---|
| CA | 2221645 | 8/2003 |
| CN | 2889448 | 4/2007 |
| DE | 2453445 | 5/1976 |
| DE | 2456428 | 8/1976 |
| DE | 3048219 | 7/1982 |
| DE | 3122047 | 12/1982 |
| DE | 3409219 | 9/1985 |
| DE | 3432855 | 3/1986 |
| DE | 3446772 | 3/1986 |
| DE | 3538589 | 5/1987 |
| DE | 3622153 | 8/1987 |
| DE | 3613041 | 10/1987 |
| DE | 3903675 | 8/1990 |
| DE | 4023753 | 1/1992 |
| DE | 4324158 | 1/1994 |
| DE | 4408888 | 9/1994 |
| DE | 4330839 | 3/1995 |
| DE | 4331467 | 3/1995 |
| DE | 4331598 | 3/1995 |
| DE | 4411279 | 10/1995 |
| DE | 29610290 | 8/1996 |
| DE | 29922324 | 5/2001 |
| DE | 102006034943 | 1/2008 |
| EP | 0040133 | 11/1981 |
| EP | 0079841 | 5/1983 |
| EP | 0408375 | 1/1991 |
| EP | 0438595 | 1/1991 |
| EP | 0319518 | 5/1993 |
| EP | 0937868 | 8/1999 |
| EP | 1008375 | 6/2000 |
| EP | 1058000 | 6/2000 |
| EP | 1106795 | 6/2001 |
| EP | 1136110 | 9/2001 |
| FR | 2684738 | 6/1993 |
| FR | 2779661 | 12/1999 |
| GB | 450490 | 7/1936 |
| GB | 541488 | 11/1941 |
| GB | 841603 | 7/1960 |
| GB | 915760 | 1/1963 |
| GB | 944384 | 12/1963 |
| GB | 982548 | 2/1965 |
| GB | 1025981 | 4/1966 |
| GB | 1239068 | 7/1971 |
| GB | 1296051 | 11/1972 |
| GB | 1427031 | 3/1976 |
| GB | 2018956 | 10/1979 |
| GB | 2021445 | 12/1979 |
| GB | 2045102 | 10/1980 |
| GB | 2061122 | 5/1981 |
| GB | 2062810 | 5/1981 |
| GB | 2088021 | 6/1982 |
| GB | 2029111 | 12/1982 |
| GB | 2132499 | 7/1984 |
| GB | 2162079 | 1/1986 |
| GB | 2139247 | 9/1987 |
| GB | 2188399 | 9/1987 |
| GB | 2206292 | 1/1989 |
| GB | 2208068 | 2/1989 |
| GB | 2230473 | 10/1990 |
| GB | 2230589 | 10/1990 |
| GB | 2233068 | 1/1991 |
| GB | 2233727 | 1/1991 |
| GB | 2312383 | 10/1997 |
| GB | 2346568 | 8/2000 |
| IT | 678800 | 12/1964 |
| JP | 404083578 | 3/1992 |
| WO | 9205856 | 4/1992 |
| WO | 9212784 | 8/1992 |
| WO | 8218218 | 10/1992 |
| WO | 9313847 | 7/1993 |
| WO | 9507745 | 3/1995 |
| WO | 9513468 | 5/1995 |
| WO | 9527574 | 10/1995 |
| WO | 9606668 | 3/1996 |
| WO | 9637274 | 11/1996 |
| WO | 9726066 | 7/1997 |
| WO | 9805408 | 2/1998 |
| WO | 9817371 | 4/1998 |
| WO | 9908773 | 2/1999 |
| WO | 9937375 | 7/1999 |
| WO | 9937908 | 7/1999 |
| WO | 9965589 | 12/1999 |
| WO | 0020093 | 4/2000 |
| WO | 0117657 | 3/2001 |
| WO | 0119494 | 3/2001 |
| WO | 01117654 | 3/2001 |
| WO | 0123819 | 4/2001 |
| WO | 0130480 | 5/2001 |
| WO | 134272 | 5/2001 |
| WO | 0139859 | 6/2001 |
| WO | 0464312 | 9/2001 |
| WO | 0183079 | 11/2001 |
| WO | 0191881 | 12/2001 |
| WO | 0192714 | 12/2001 |
| WO | 0205926 | 1/2002 |
| WO | 0211854 | 2/2002 |
| WO | 01180967 | 5/2010 |
| WO | 2010056711 | 5/2010 |
| WO | 2010070102 | 6/2010 |
| WO | 2011047754 | 4/2011 |

* cited by examiner

FILTER CARTRIDGE

BACKGROUND

The field of the invention generally relates to fluid treatment cartridges, and more particularly, to a removable filter cartridge for an appliance, such as a refrigerator.

Removable water filter cartridges have previously been disclosed for use in appliances which utilize water, especially where the water is for human consumption. For example, water filter cartridges have been used in refrigerators to filter the water to supply the ice maker used to supply an automatic ice maker and/or a water dispenser built into the refrigerator. A water supply line is connected to the refrigerator to supply the water to the refrigerator, and the water is routed through tubing in the refrigerator to the water filter cartridge and then to the ice maker and/or water dispenser. Several examples of refrigerators having water filter cartridges are disclosed in U.S. Pat. Nos. 6,120,685, 6,337,105, 7,000,894 and 7,147,773.

Because the water filter cartridges eventually become ineffective and need to be changed, a water filter cartridge and an appliance interface to which the water filter cartridge is connected are configured to allow the water filter cartridge to be removed and replaced with a new water filter cartridge. The water filter cartridge has a cartridge inlet, a cartridge outlet, and a filter in fluid communication with the cartridge inlet and cartridge outlet. The interface, also referred to herein as a head assembly, includes an inlet port which connects to the cartridge inlet and an outlet port which connects to the cartridge outlet. The interface also has a supply inlet connected to the water supply and a supply outlet which supplies the water to the ice maker and/or water dispenser.

In order to facilitate the replacement of the water filter cartridge, i.e. the removal of a used cartridge and installation of a new cartridge, some previous appliance interfaces have valves which are actuated by the water filter cartridge, such as upon installing and removing the water filter cartridge to the appliance interface. Some interfaces also include a bypass valve which is opened when a water filter cartridge is not installed in order to allow water to flow to the ice maker and/or water dispenser even without a water filter cartridge. Thus, the water filter cartridge may also actuate the bypass valve such that installing the water filter cartridge closes the bypass valve, and removing the water filter cartridge opens the bypass valve. Examples of filter cartridges which actuate an inlet and outlet valve and/or a bypass valve are disclosed in U.S. Pat. Nos. 7,000,894, 7,147,773, and 5,256,285.

SUMMARY

In one embodiment, the present invention is directed to a new filter cartridge which is configured to be removably coupled to an appliance interface (also referred to as an "interface" or "head assembly") and which is also configured to actuate an interference member of the interface which selectively locks the actuation of a component of the interface. For example, in one embodiment, the interface includes a main housing having a receiver for receiving the filter cartridge. The interface also has rotatable filter port assembly disposed in the housing such that rotation of the filter port assembly actuates the interface between a bypass mode in which water flows from an inlet of the interface to an outlet of the interface when a filter cartridge is not installed and a filter mode in which water flows from the inlet, through the filter cartridge, and out of the outlet. The interference member prevents the interface from being actuated to the filter mode without a filter cartridge being installed because the filter cartridge has an actuator which, during installation of the filter cartridge into the interface, actuates the interference member from an interference position which prevents the interface from being actuated to the filter mode to a non-interference position which allows the interface to be actuated to the filter mode.

The filter cartridge includes a cartridge housing having a first end and a second end and extending along a housing longitudinal axis through the first end and the second end. The cartridge housing may be cylindrical, substantially cylindrical, or other suitable shape. A filter media is contained within the cartridge housing between the first end and the second end. The filter cartridge has a first end cap covering the first end of the cartridge housing and a second end cap covering the second end of the cartridge housing.

The filter cartridge has an engagement fitting extending from the first end cap which is configured to be received in an interface port of the filter port assembly of the interface. The engagement fitting includes a base portion attached to, and extending from, the first end cap. The base portion has a top surface opposite the first end cap. The engagement fitting also has a rectangular sealing member extending distally from the top surface of the base portion. As used herein, the term "distal" and its other forms, and "proximal" and its other forms, are referenced based on the interface being located distal to the filter cartridge such that the filter cartridge is moved distally to install it on the interface, and the filter cartridge being located proximal to the interface. The sealing member has an outer edge on a top end of the sealing member and two opposing side edges extending from opposing ends of the top end. A first seal is disposed along the entire outside edge and is configured to seal against an inside surface of the interface port when the engagement fitting is installed in the interface port.

The base portion has an inlet aperture on the top surface of the base portion. The inlet aperture is located on a first side of the sealing member and is in fluid communication with a filter inlet of the filter media. The base portion has an outlet aperture on the top surface of the base portion. The outlet aperture is located on a second side of the sealing member opposite the first side, and is in fluid communication with a filter outlet of the filter media. The inlet aperture and outlet aperture are on opposite sides of the sealing member such that when the engagement fitting is installed in the interface port, the sealing member seals the inlet aperture from the outlet aperture such that fluid cannot flow directly from the inlet aperture to the outlet aperture within the interface port.

The filter cartridge also has an interference member actuator extending axially and distally from at least one of the first end of the cartridge housing and the first end cap. The interference member actuator is configured to actuate an interference member of the interface from an interference position in which the interface is prevented from being actuated from the bypass mode to the filter mode to a non-interference position in which the interface can be actuated from the bypass mode to the filter mode.

In another aspect, the interference member comprises an elongated shaft having a first end connected to one of the first end of the cartridge housing and the first end cap and a second end distal to the first end. The second end also has a slanted cam surface which is configured to exert a force on the interference member to actuate the interference member when the cam surface is moved relative to the interference member. This typically occurs when the filter cartridge is inserted and pushed distally into the interface receiver during installation of the filter cartridge into the interface.

In still another aspect, the filter cartridge further comprises a first guide slot extending along the outer surface of the cartridge housing. The first guide slot is configured to receive a first guide, such as a guide pin, disposed on an interior wall of the interface receiver. The first guide slot may have a first portion that extends substantially parallel to the housing longitudinal axis and a second portion extends laterally to the housing longitudinal axis. The second portion has a first end that intersects with the first portion and a second end laterally spaced apart from the first end.

In still another feature, the filter cartridge may have a second guide slot configured similarly to the first guide slot, but spaced away from the first guide slot. For instance, the second guide slot may be positioned on the opposite side of the cartridge housing to the first guide slot.

In an alternative embodiment of the filter cartridge, the interference member is configured to actuate an interference member of the interface from an interference position in which the interface port is prevented from being rotated past a stop position thereby preventing the interface from being actuated from a bypass mode to a filter mode to a non-interference position in which the interface port can be rotated past the stop position thereby allowing the interface to be actuated from the bypass mode to the filter mode.

Another embodiment of the present invention is directed to a fluid filter assembly comprising a filter cartridge in combination with an appliance interface. Accordingly, the fluid filter assembly comprises a filter cartridge, as described above. The fluid filter assembly also comprises an appliance interface which is configured to receive the filter cartridge. The appliance interface is actuatable between a bypass mode in which fluid flows from an inlet to an outlet of the interface without flowing through the filter cartridge (e.g., when the filter cartridge is not installed on the interface), and a filter mode in which water flows from the inlet, through the filter cartridge, to the outlet (e.g., when the filter cartridge is installed on the interface).

The appliance interface has a main housing having an interface receiver configured to receive the filter cartridge. The main housing also has an inlet fitting (the inlet) which is connected to a source of fluid, such as water, supplied to the appliance, and an outlet fitting (the outlet) which supplies the fluid to the appliance after flowing through the interface (in the bypass mode) or through the interface and the filter cartridge (in a filter mode).

The interface has a rotatable filter port assembly disposed in the main housing. The filter port assembly has a filter port for receiving the engagement fitting of the filter cartridge. The filter port assembly is configured such that it is rotatable between a bypass position which puts the interface in the bypass mode and a filter position which puts the interface in the filter mode. The filter port assembly has an inlet lumen having a downstream end in fluid communication with an inlet portion of the filter port and an upstream end at the opposite end of the inlet lumen. When the filter port assembly is in the filter position, the upstream end of the inlet lumen is in fluid communication with the inlet fitting. The filter port assembly has an outlet lumen having an upstream end in fluid communication with an outlet portion of the filter port and a downstream end at the opposite end of the outlet lumen. The downstream end is in fluid communication with the outlet fitting when the filter port assembly is in the filter position.

The fluid port assembly also has a bypass conduit which is not in fluid communication with the filter port, inlet lumen and outlet lumen, i.e., it is isolated or sealed from the filter port. The bypass conduit has a bypass inlet on a first end of the bypass conduit and a bypass outlet on a second end of the bypass conduit.

As stated above, the filter port assembly is configured such that it is rotatable between a bypass position and a filter position. In one way, the bypass conduit may be positioned transverse to the alignment of the upstream end of the inlet lumen and the downstream end of the outlet lumen such that the filter port assembly is rotatable from the bypass position in which the bypass inlet and bypass outlet of the bypass conduit are connected to the inlet fitting and outlet fitting, respectively, to a filter position in which the inlet lumen and outlet lumen are connected to the inlet fitting and outlet fitting, respectively. Therefore, in the bypass mode (e.g., with no filter cartridge installed on the interface), the fluid from the source flows into the inlet fitting, through the bypass inlet and bypass conduit, and then through the bypass outlet into the outlet fitting. In the filter mode (e.g., with the filter cartridge installed on the interface), the fluid from the source flows into the inlet lumen of the filter port, into the inlet portion of the filter port, then into inlet aperture of the engagement fitting of the filter cartridge and into a filter inlet of the filter media. The fluid then flows through the filter media, through the filter outlet of the filter media, through the outlet aperture of the engagement fitting, through the outlet port of the filter port and out through the outlet fitting.

The interface also has an interference member which is actuatable from an interference position which prevents the filter port assembly from being actuated (rotated) from the bypass position to the filter position, to a non-interference position which allows the filter port assembly to be actuated (rotated) from the bypass position to the filter position. In one aspect, the interference member may comprise a catch which abuts a stop on the rotatable filter port assembly. The catch is movable from an interference position in which it abuts the stop and prevents the filter port assembly from rotating to a non-interference position in which the stop is free to move past the catch thereby allowing the filter port assembly to rotate past the interference member. The catch is movable from the interference position to the non-interference position by the interference member actuator which actuates the interference member from the interference position to the non-interference position as the filter cartridge is inserted and installed into the interface. The catch and stop may be configured to be "one-way" in that they cooperate to prevent rotation of the filter port assembly from the bypass mode to the filter mode, but allow rotation of the filter port assembly from the filter mode to the bypass mode even when the interference member is not actuated to the non-interference position.

In additional aspects, the filter cartridge of the fluid filter assembly may include any of the additional features and aspects described above, and the appliance interface is configured accordingly.

The installation and operation of the fluid filter assembly to replace a filter cartridge installed in an appliance will now be described. With an old filter cartridge installed on the appliance interface of the appliance, the cartridge housing of the old filter cartridge is installed in the interface receiver such that the engagement fitting is fully inserted into the filter port. The interface is in the filter mode with the filter port assembly rotated to the filter position. In the filter position, the inlet lumen is connected to the inlet fitting and the outlet lumen is connected to the outlet fitting. In this position, fluid coming from the fluid source flows into the inlet fitting of the appliance interface, into the inlet lumen of the filter port assembly, into the inlet portion of the filter port, into the inlet aperture of the engagement fitting of the filter cartridge, into the filter inlet of the filter media, and then the fluid flows through the filter media, out through the filter outlet of the filter media, out through the outlet aperture of the engagement fitting, through the outlet lumen of the filter port assembly and out through the outlet fitting.

To remove the currently installed old filter cartridge, the filter cartridge is rotated in a first rotational direction such that the first guide follows the second portion of the first guide slot. As the filter cartridge is rotated, the filter port assembly rotates along with the filter cartridge due to the connection of the engagement fitting to the filter port. As the filter port assembly rotates, the interface transitions from the filter mode to the bypass mode. Just before the first guide reaches the first end of the second portion of the first guide slot (i.e., where the second portion intersects with the first portion), the interference member rotates past the stop in the direction in which the interference member is not stopped by the stop. When the first guide reaches the end of the second portion of the first guide slot (i.e., where the second portion intersects with the first portion), the filter port assembly is rotated to the bypass position in which the bypass inlet is connected to the inlet fitting and the bypass outlet is connected to the outlet fitting. After the filter cartridge is rotated such that the first guide reaches the intersection of the second portion and the first portion of the first guide slot, the filter cartridge is withdrawn proximally from the interface such that the first guide follows the first portion of the first guide slot. As the filter cartridge is withdrawn, the engagement fitting withdraws from the filter port and the cartridge housing withdraws from the interface receiver until the filter cartridge is fully removed from the interface.

A new filter cartridge is installed by reversing the process described above, except that the interference member is actuated by the interference member actuator of the filter cartridge. The filter cartridge is inserted into the interface with the first guide following along the first portion of the first guide slot. When the first guide reaches the second portion and the filter cartridge begins to be rotated such that the first guide follows the second portion, the interference member actuator actuates the interference member to the non-interference position which allows the interference member to move past the stop as the filter cartridge and filter port assembly continue to be rotated. The filter cartridge and filter port assembly continue to be rotated until the first guide reaches the second end of the first guide slot such that the filter port assembly is rotated to the filter position, and the interface and the filter cartridge are in the filter mode, as described above.

BRIEF DESCRIPTION OF THE DRAWINGS

The foregoing and other aspects of embodiments are described in further detail with reference to the accompanying drawings, wherein like reference numerals refer to like elements and the description for like elements shall be applicable for all described embodiments wherever relevant.

DETAILED DESCRIPTION

Figure 1:
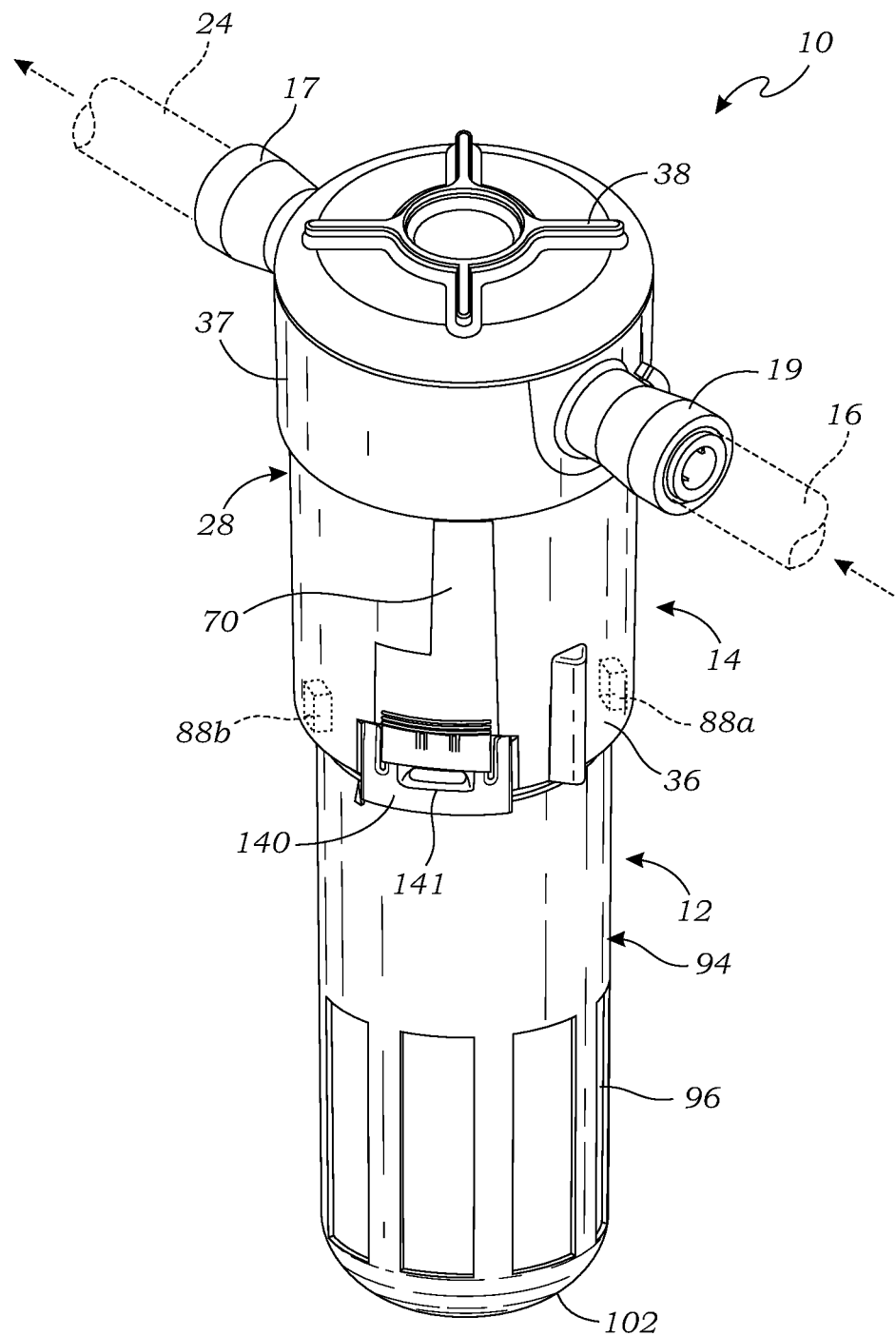
FIG. 1 is side, perspective view of a fluid filter assembly including a filter cartridge installed on an appliance interface, according to one embodiment of the present invention.
Figure 2:
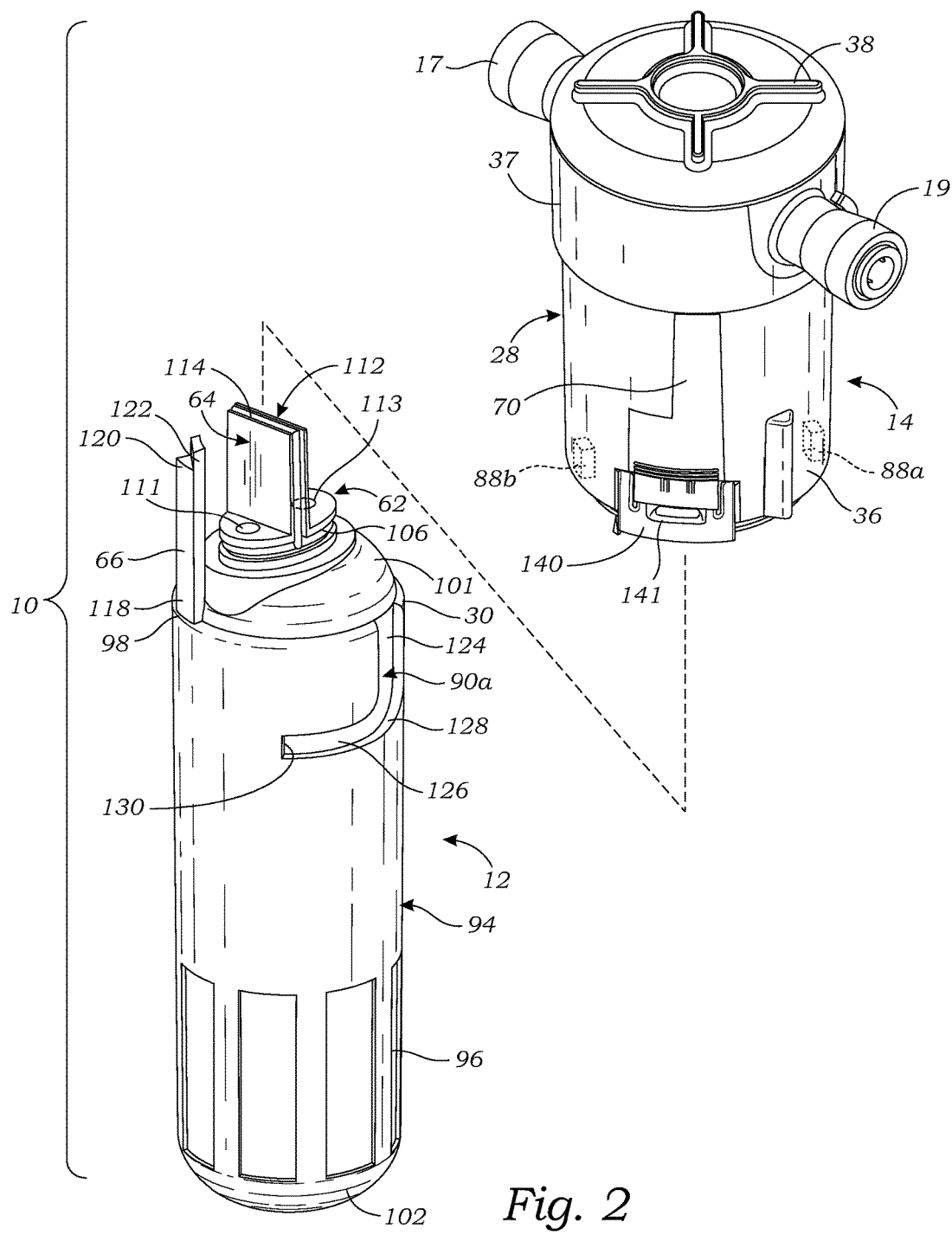
FIG. 2 is a side, perspective view of the fluid filter assembly of FIG. 1, with the filter cartridge uninstalled from the appliance interface, according to one embodiment of the present invention.
Figure 3:
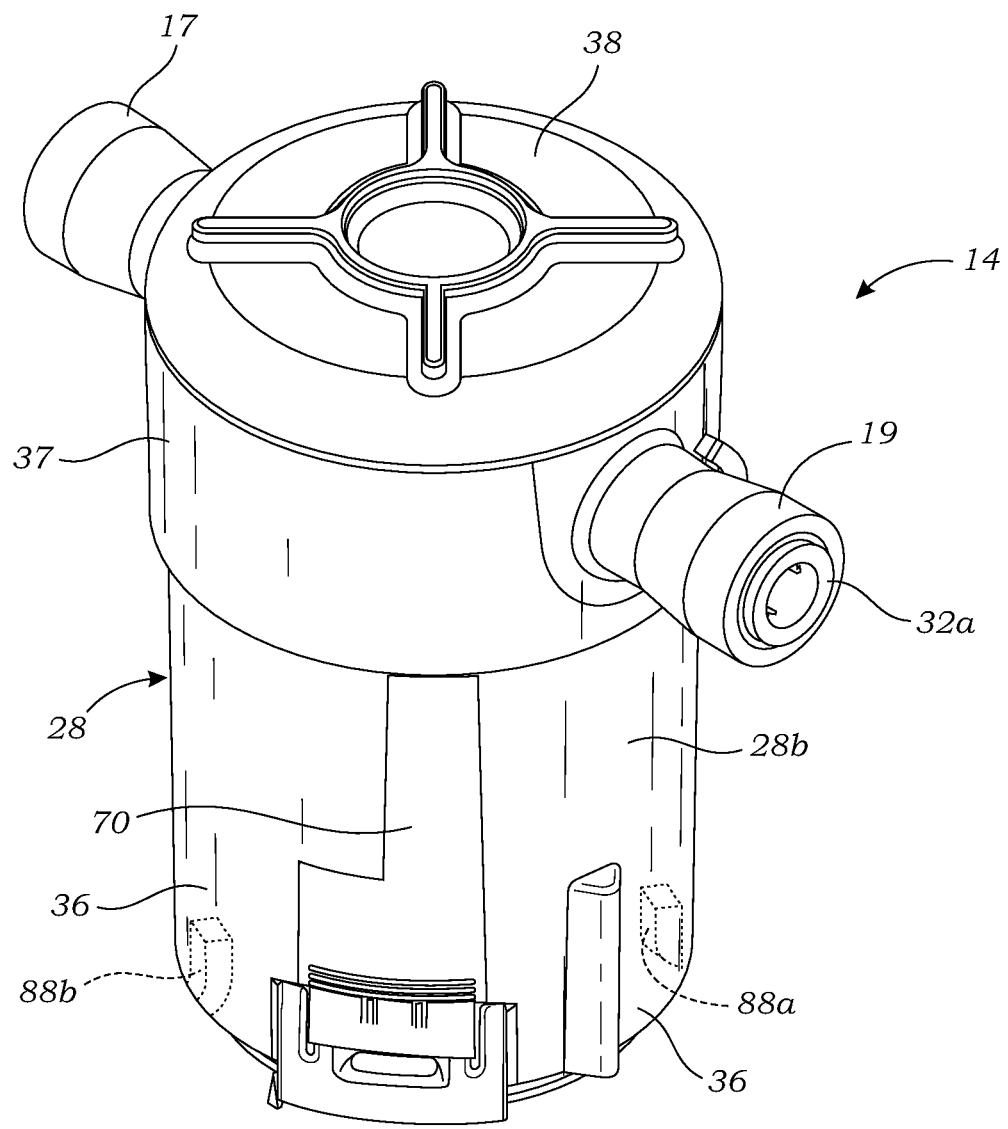
FIG. 3 is a side, perspective view of the appliance interface of FIG. 1, according to one embodiment of the present invention.
Figure 4:
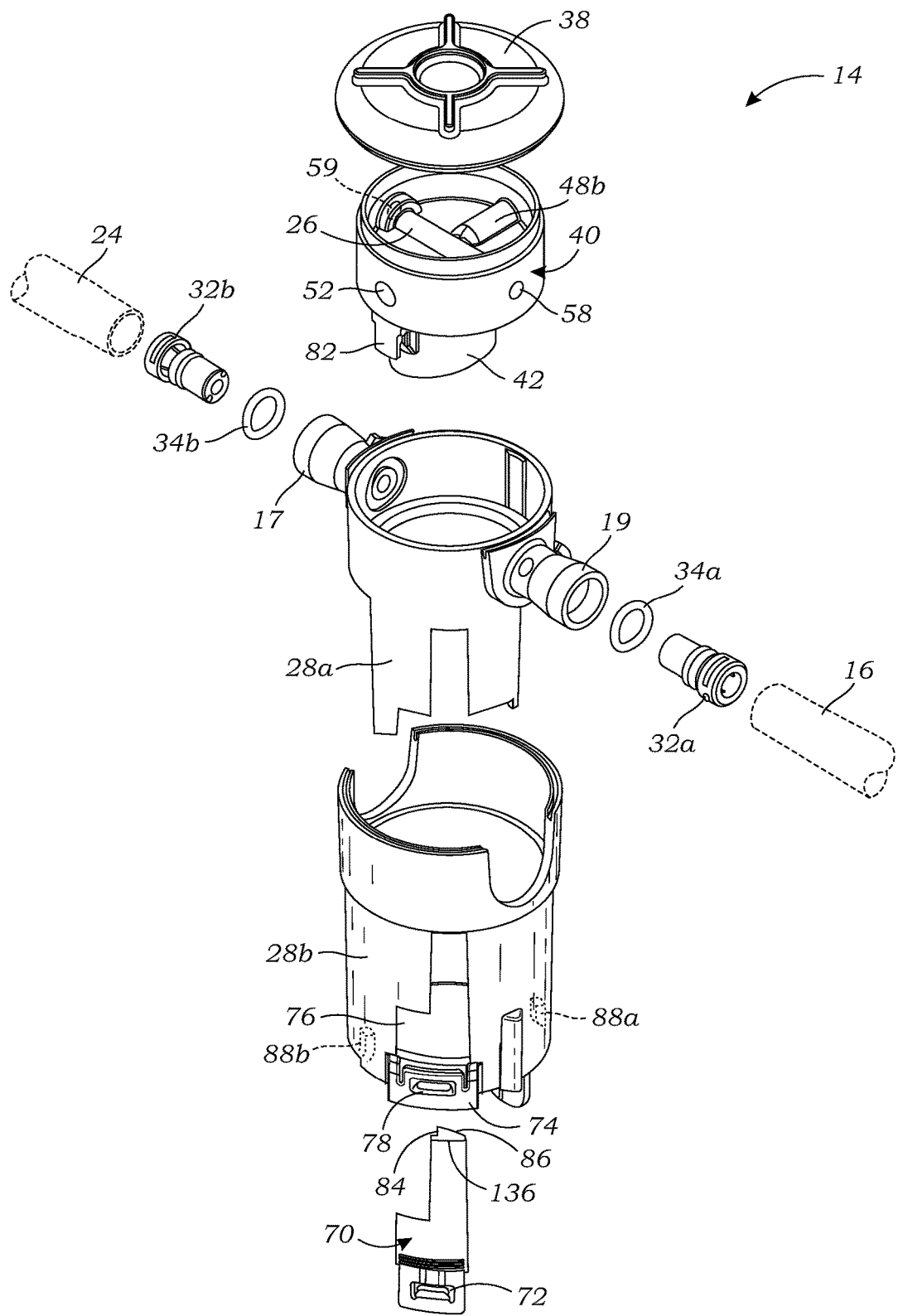
FIG. 4 is a side, perspective, exploded view of the appliance interface of FIG. 1, according to one embodiment of the present invention.
Figure 5:
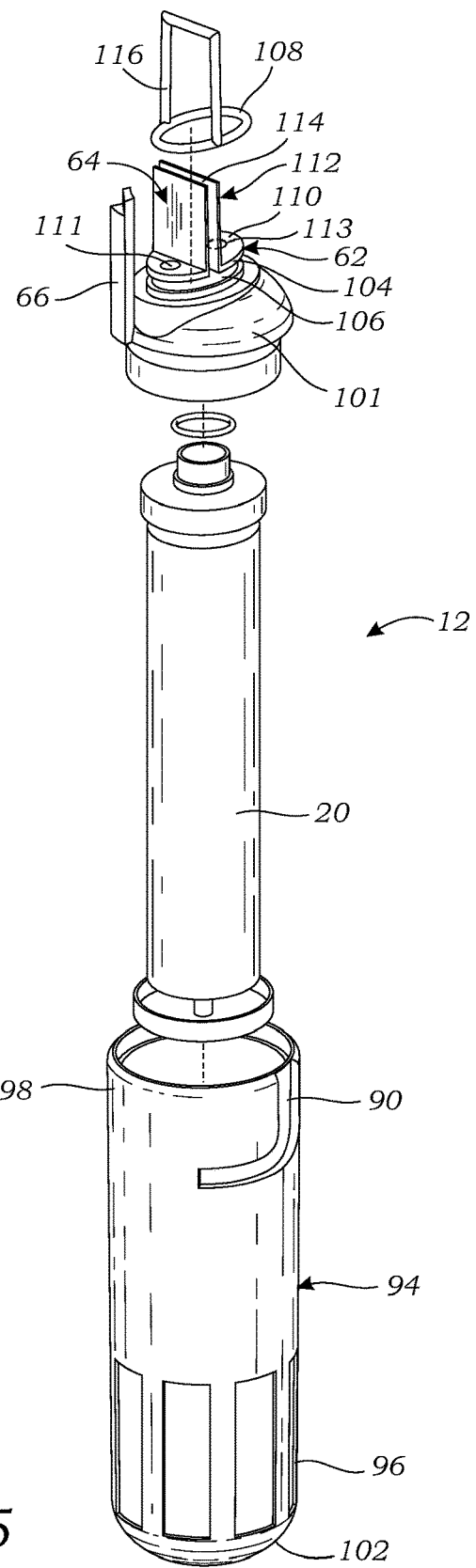
FIG. 5 is a side, perspective, exploded view of the filter cartridge of FIG. 1, according to one embodiment of the present invention.
Figure 6:
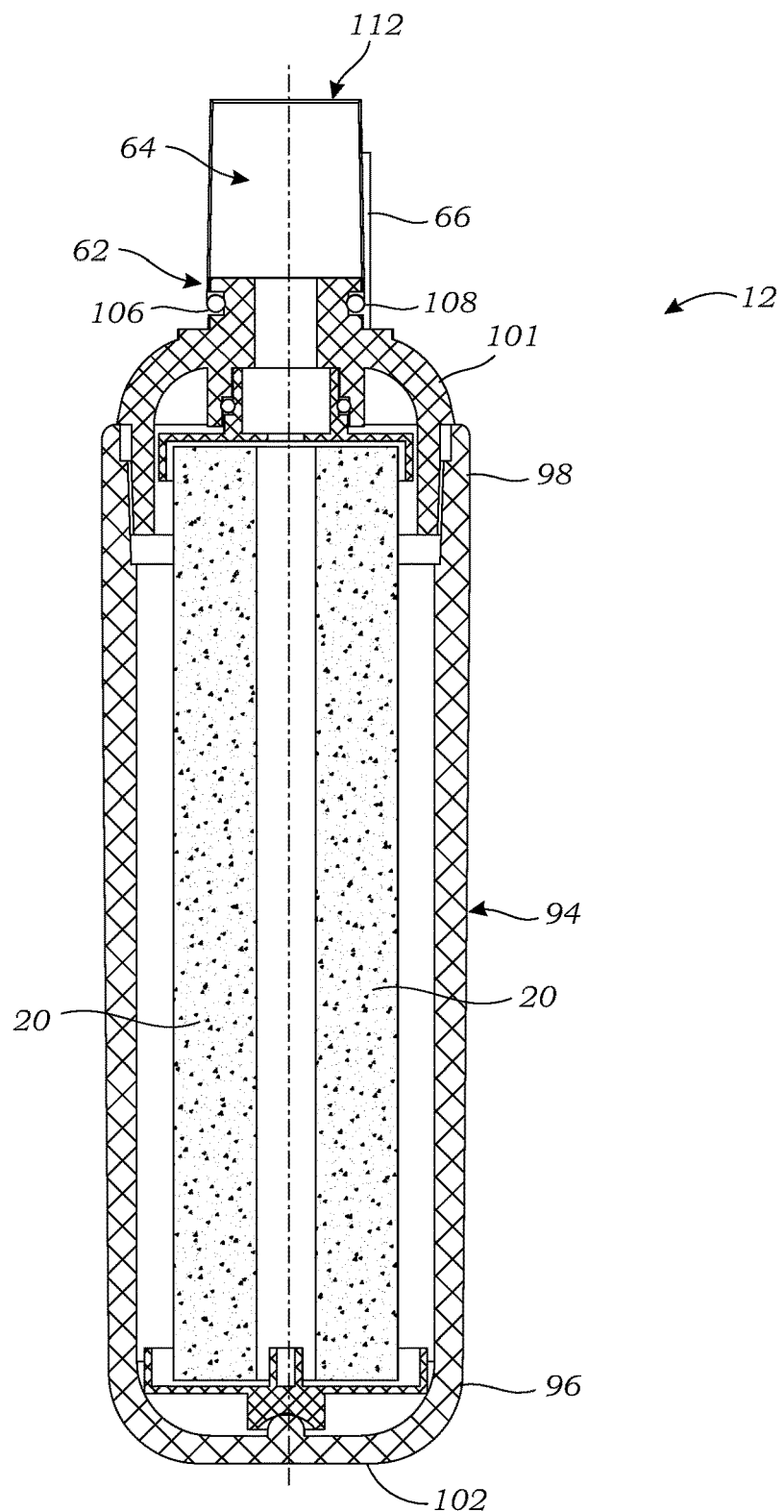
FIG. 6 is a front, cross-sectional view of the filter cartridge of FIG. 1, according to one embodiment of the present invention.
Figure 7A:
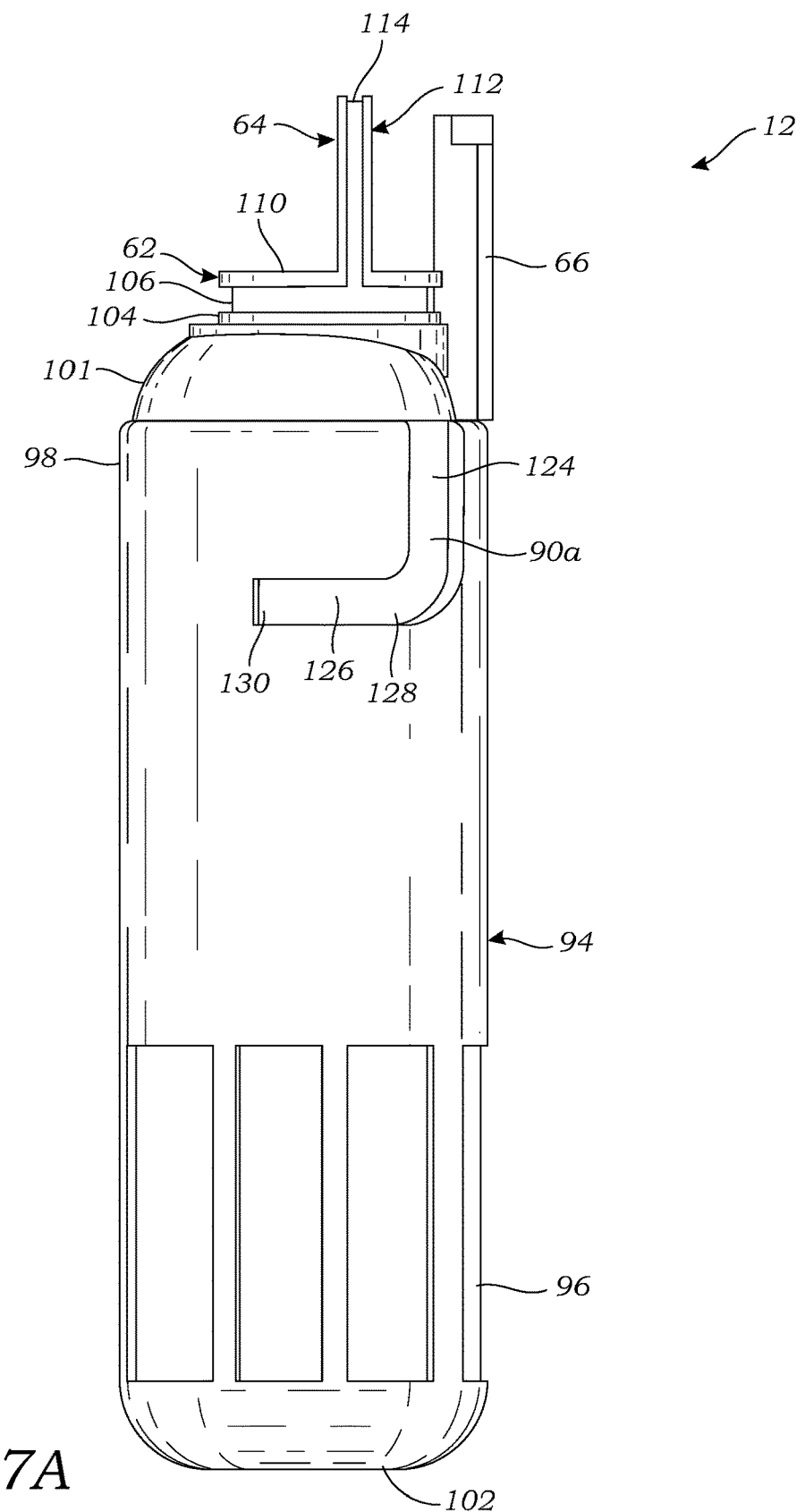
FIG. 7A is a side, elevational view of the filter cartridge of FIG. 1, according to one embodiment of the present invention.
Figure 7B:
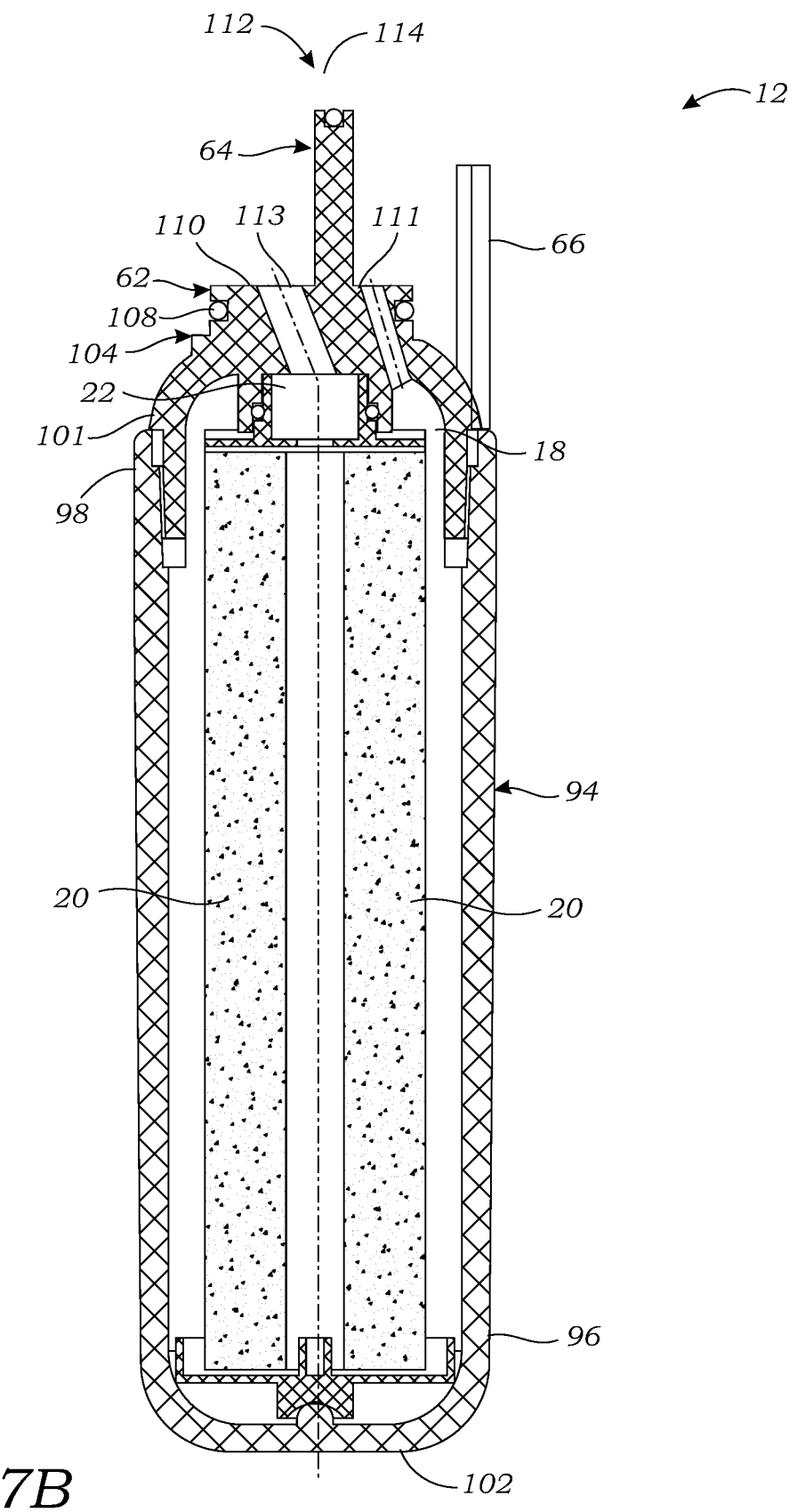
FIG. 7B is a side, cross-sectional view of the filter cartridge of FIG. 1, according to one embodiment of the present invention.
Figure 8:
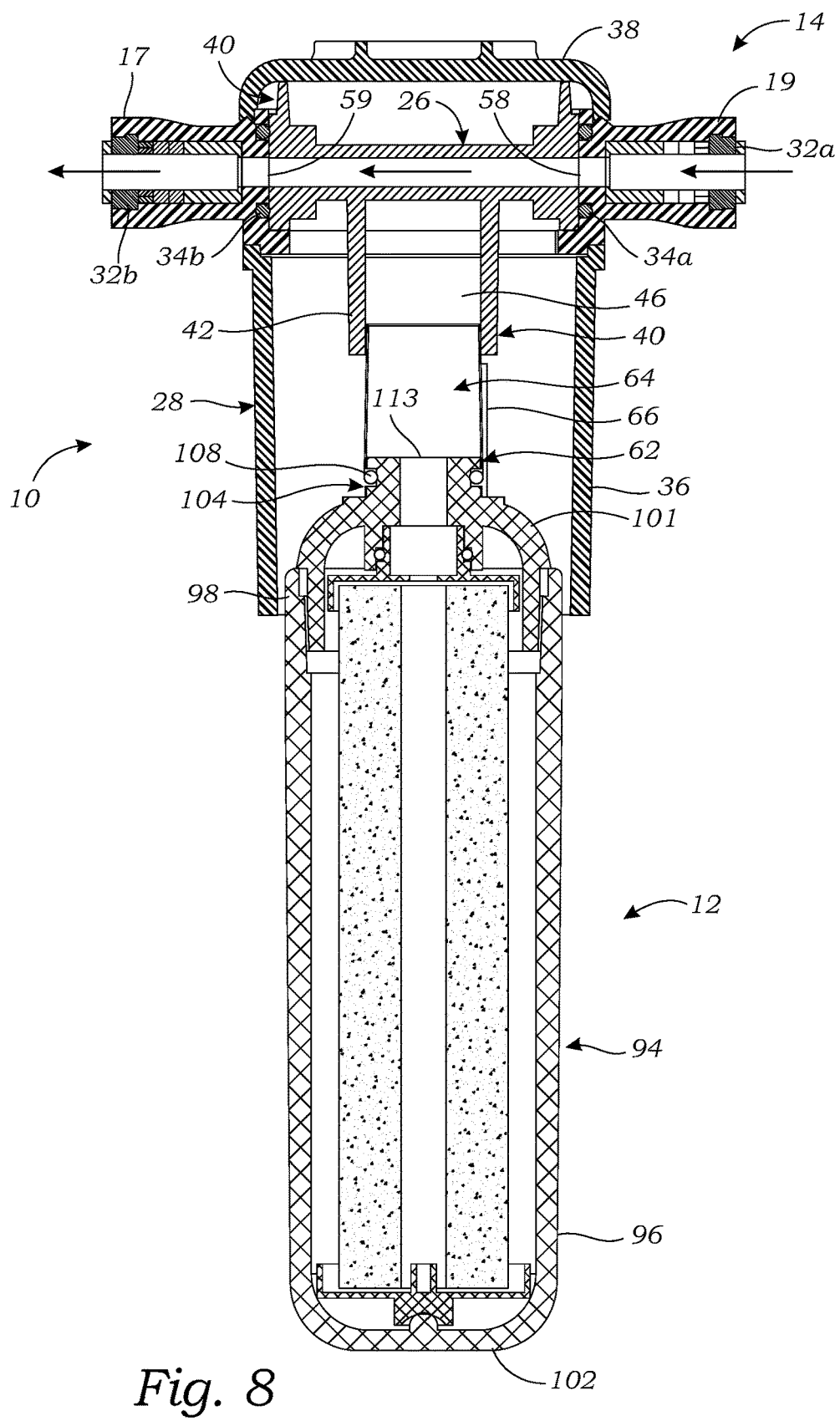
FIG. 8 is a side, cross-sectional view of the fluid filter assembly of FIG. 1, with the filter cartridge uninstalled from the appliance interface and the appliance interface in a bypass mode, according to one embodiment of the present invention.

Referring to FIGS. 1 and 2, one embodiment of a fluid filter assembly 10 according to the present invention is shown. The filter assembly 10 includes a filter cartridge 12 which installs onto, and couples to, an appliance interface 14. The appliance interface 14 is an interface which is installed in an appliance, such as a refrigerator, washing machine, dishwasher, or other appliance, which utilizes a fluid, such as water, in which the fluid is treated using a filter cartridge 12. The filter assembly 10 is configured so that the filter cartridge 12 can be removed and replaced when a filter cartridge 12 becomes old, clogged, and/or ineffective for treating the fluid being utilized by the appliance. For example, the filter assembly 10 is advantageously configured to be actuatable between a filter mode when the filter cartridge 12 is installed onto the interface 14, and a bypass mode when the filter cartridge is not installed on the interface 14. In the filter mode, the filter assembly 10 directs the fluid from an inlet fitting 19 of the interface 14 connected to a fluid source to flow through a filter inlet 18 (see FIGS. 7 and 9) of the filter cartridge 12, through a filter media 20 (see FIGS. 5 and 6-9), out through a filter outlet 22 and out through an outlet fitting 17 of the interface 14 to supply filtered fluid to the appliance. In the bypass mode, the filter assembly 10 directs the fluid from the inlet fitting 19 through a bypass conduit 26 and out through the outlet fitting 17 to supply untreated fluid to the appliance. In the filter mode, the bypass conduit 26 is disconnected (i.e., sealed) from the inlet fitting 19 and outlet fitting of the interface 14. In the bypass mode, the filter inlet 18 and filter outlet 22 are disconnected (i.e., sealed) from the inlet fitting 19 and outlet fitting 17 of the interface 14.

Referring now to FIGS. 1-4, the interface 14 comprises a main housing 28 having a substantially cylindrical shape. The main housing 28 includes a cylindrical interior wall 28A received in a cylindrical exterior wall 28B. The main housing 28 has an interface receiver 36 at its proximal end configured to receive at least a portion of the proximal end 30 of the filter cartridge 12, and a fluid handling portion 37 at its distal end. The inlet fitting 19 is connected to the interior wall 28A and extends radially outward from the interior wall 28A. Similarly, the outlet fitting 17 is connected to the interior wall 28A and extends radially outward from the interior wall 28A. The inlet fitting 19 and outlet fitting 17 are spaced apart 180° from each other on the circumference of the interior wall 28A (i.e., on opposite sides of a diameter of the interior wall 28A). In alternative embodiments, the inlet fitting 19 and outlet fitting 17 may be spaced apart at any other suitable angle on the circumference of the interior wall 28A, such as 60°, 90°, 120°, 150°.

The inlet fitting 19 has a coupling 32a configured to be connected to an inlet fluid tube 16 which is in fluid communication with a source of fluid (e.g., water). A gasket 34a is disposed between the inlet fitting 19 and coupling 32a to seal the coupling 32a to the inlet fitting 19. The outlet fitting 17 has a coupling 32 configured to be connected to an outlet fluid tube 24 which supplies the fluid from the fluid filter assembly to the appliance (e.g., to an ice maker, water dispenser, etc.). Another gasket 34b is disposed between the outlet fitting 17 and the coupling 32b to seal the coupling 32b to the outlet fitting 17.

The main housing 28 also has an end cap 38 disposed on the distal end of the main housing 28 which covers the distal end of the main housing 28.

Figure 9:
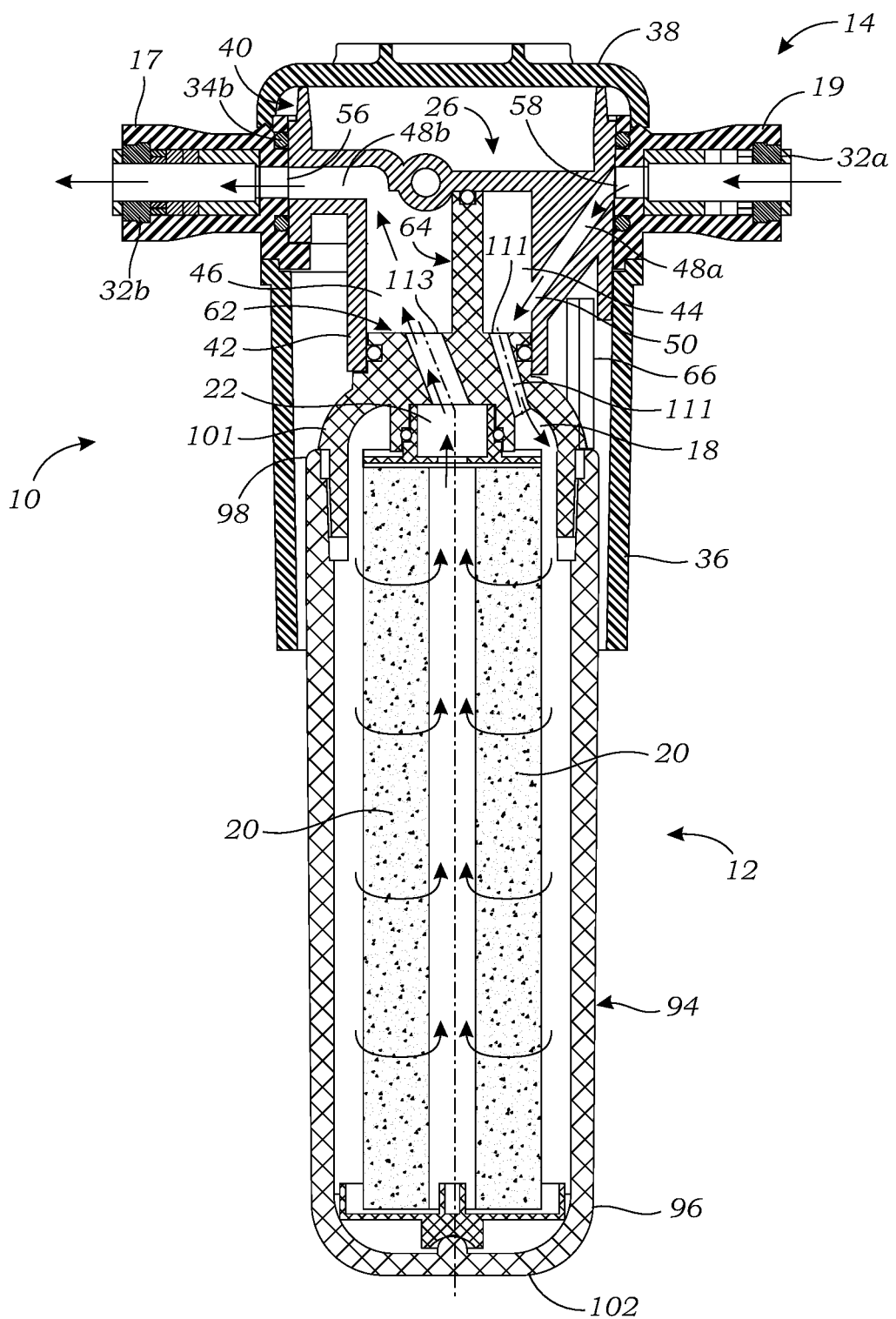
FIG. 9 is a side, cross-sectional view of the fluid filter assembly of FIG. 1, with the filter cartridge installed on the appliance interface and the appliance interface in a filter mode, according to one embodiment of the present invention.

The interface 14 also includes a rotatable filter port assembly 40 disposed within the main housing 28. The filter port assembly 40 is rotatable inside the main housing 28 between a bypass position (see FIG. 8) in which the interface 14 is in the bypass mode, and a filtering position (see FIG. 9) in which the interface 14 is in the filtering mode. The filter port assembly 40 has a filter port 42 configured to receive an engagement fitting 62 of the filter cartridge 12 (see FIG. 9 showing the filter cartridge 12 installed on the interface 14 with the engagement fitting 62 received in the filter port 42). The filter port 42 has an inlet portion 44 on a side of the filter port 42 which is on a first side of a sealing member 64 of the filter cartridge 12 when the filter cartridge 12 is installed on the interface 14. The filter port 42 has an outlet portion 46 on a side of the filter port which is on a second side opposite the first side of a sealing member 64 of the filter cartridge 12 when the filter cartridge 12 is installed on the interface 14 (see FIG. 9). The filter port assembly 40 has a filtering fluid path 48 through which the fluid flows when the filter port assembly is in the filtering position. The filtering fluid path 48 includes an inlet lumen 48a and an outlet lumen 48b. The inlet lumen 48a has a downstream end 50 in fluid communication with the inlet portion 44 of the filter port 42 and an upstream end 52. When the filter port assembly 40 is in the filtering position (see FIG. 9), the upstream end 52 is in fluid communication with the inlet fitting 19. The outlet lumen 48b has an upstream end 54 in fluid communication with the outlet portion 46 of the filter port 42 and a downstream end 56. When the filter port assembly is in the filtering position (see FIG. 9), the downstream end 56 is in fluid communication with the outlet fitting 17.

The fluid port assembly 40 also has a bypass conduit 26. The bypass conduit 264 is not in fluid communication with the fluid port 42, inlet lumen 48a and outlet lumen 48b. In other words, the bypass conduit 26 is isolated or sealed from the filter port 42, inlet lumen 48a and outlet lumen 48b. The bypass conduit 26 has a bypass inlet 58 on an upstream end of the bypass conduit 26 and a bypass outlet 59 on a downstream end of the bypass conduit 26. In the illustrated embodiment, the bypass conduit 26 is aligned transverse (at a 90° angle) to the alignment of the filtering fluid path 48 (the filtering fluid path 48 includes the inlet lumen 48a and the outlet lumen 48b). Orienting the alignment of the bypass conduit 26 (represented by a line between the upstream end 52 of the inlet lumen 48a and the downstream end 56 of the outlet lumen 48b) at an angle to the alignment of the filtering fluid path 48 (represented by a line between the bypass inlet 58 and the bypass outlet 59) allows the filter port assembly 40 to be able to rotate between a bypass position in which the bypass inlet 58 and bypass outlet 59 of the bypass conduit 26 are connected to the inlet fitting 19 and outlet fitting, respectively, and a filtering position in which the upstream end 52 of the inlet lumen 48a and the downstream end of the outlet lumen 48b are connected to the inlet fitting 19 and outlet fitting, respectively.

Referring to FIGS. 1-4, the interface 14 has an interference member 70 which is attached to, and forms a portion of, the interface receiver 36. The interference member 70 is actuatable from an interference position which prevents the filter port assembly 40 from being actuated (rotated) from the bypass position to the filtering position, to a non-interference position which allows the filter port assembly 40 to be actuated (rotated) from the bypass position to the filter position. More specifically, the interference member 70 is attached to, and forms a portion of, the exterior wall 28b of the interface receiver 36. The exterior wall 36b has an opening 76 into which the interference member 70 fits such that the interference member 70 forms a portion of the exterior wall 28b. The interference member 70 is attached to the exterior wall 36b proximate the interface receiver 36 of the main housing 28. The interference member 70 includes a clip tab 72 which fastens to a securing clip 74 disposed on the exterior wall 28b in order to attach the interference member 70 to the exterior wall 28b. The securing clip 74 has a clip aperture 78 which receives the clip tab 72, such as a snap fit. The interference member 70 has a catch 80 configured to abut a stop 82 on the outer circumference of the filter port assembly 40. The catch 80 has a catch wall 84 which, in the interference position, prevents the stop 82 on the filter port assembly 40 from being rotated past the catch 80. The catch 80 also has a slanted cam wall 86 opposite the catch wall 84. The cam wall 86 is configured to force the catch 80 from the interference position to the non-interference position when the filter port assembly 40 is rotated from the filtering position to the bypass position (i.e., from the position in which the stop 82 has been rotated clockwise past the catch 80, and is then being rotated counter-clockwise past the catch 80). As used herein, the terms "clockwise" and "counterclockwise" are from the perspective looking distally from the bottom of the filter cartridge 12 towards the end cap 38 of the interface 14. Thus, the catch 80 and stop 82 are configured to be "one-way" in that they cooperate to prevent rotation of the filter port assembly 40 from the bypass mode to the filter mode when the interference member 70 is in the interference position, but allow rotation of the filter port assembly 40 from the filter mode to the bypass mode even when the interference member is not actuated to the non-interference position. The structure of the interference member 70 and/or the form of the attachment to the exterior wall 28 allow the interference member 70 to resiliently deflect from the interference position to the non-interference position based on a force applied or released by an interference member actuator 66 of the filter cartridge 12.

Still referring to FIGS. 1-4, the interface 14 also includes a first guide 88a and a second guide 88b disposed on the interior wall of the interface receiver 36. The first guide 88a and second guide 88b are configured to be received in a first guide slot 90 and second guide slot 92 of the filter cartridge 12. The first guide 88a and second guide 88b are spaced apart 180° from each other on the circumference of the inside wall of the interface receiver 36 (i.e., on opposite sides of a diameter of the inside wall of the receiver 36). The first guide 88a, second guide 88b, first guide slot 90 and second guide slot 92 cooperate to properly align and rotate the filter cartridge 12 relative to the interface 14 during installation and removal of a filter cartridge 12 on the interface 14.

Turning now to FIGS. 1, 2, and 5-10, the filter cartridge 12 will now be described. The filter cartridge 12 has a cartridge housing 94 having a proximal end 96 and a distal end 98. The cylindrical cartridge housing 94 extends along a longitudinal axis from the proximal end 96 to the distal end 98. The distal end 98 is configured to be received in the interface receiver 36 of the interface 14. The cartridge housing 94 as shown is cylindrical, but may alternatively be substantially cylindrical, or have any other suitable cross-section, such as square, rectangular, elliptical, etc. The term "substantially cylindrical" means that the component is mostly cylindrical, but may be slightly non-cylindrical, such as having a cross-section which is not exactly circular or having one or more portions which are not exactly circular or differing insubstantially from a cylindrical shape.

A filter media 20 is contained within the cartridge housing and extends from the proximal end 96 to the distal end 98. The filter cartridge 12 has a first end cap 101 covering the distal end 98 of the cartridge housing 94 and a second end cap 102 covering the proximal end 96 of the cartridge housing 94.

The engagement fitting 62 extends distally from the first end cap 101 and is configured to be received in the interface port 40 of the interface 14. The engagement fitting 62 has a base portion 104 which is attached to the first end cap 101. The base portion 104 extends distally from the first end cap 101. The base portion 104 has a cross-section which matches the shape of the interface port 40 and is sized to allow the base portion 104 to fit into the interface port 40 with a small clearance around the entire perimeter of the base portion 104. The base portion 104 has a seal groove 106 around the perimeter of the base portion 104 and a base seal 108 disposed in the seal groove 106 which seals against the inside surface of the interface port 40 providing a fluid tight seal between the base portion 104 and the interface port 40. The base seal 108 may be an o-ring, or other suitable gasket. The base portion 104 has a top surface 110 on the distal end of the base portion 104 opposite the first end cap 101.

The engagement fitting 66 also has a sealing member 64 attached to, and extending distally from, the top surface 110 of the base portion 104. The sealing member 64 is configured to seal against the inside surface of the filter port 42 and to seal the inlet portion 44 of the filter port 42 from the outlet portion 46 of the filter port 42 when the filter cartridge 12 is installed on the interface 14. The sealing member 64 has an outer edge 112 on a top (i.e., distal) end of the sealing member 64 and the two opposing sides extending proximally from opposing ends of the top end. In the illustrated embodiment, the sealing member 64 has a rectangular shape configured to fit into the interface port 40 with a small clearance between the outer edge 112 of the sealing member 64 and the inside surface of the interface port. The outer edge 112 has a seal groove 114 and a fitting seal 116 is disposed in the seal groove 114 which seals against the inside surface of the filter port 42

The base portion 104 has an inlet aperture 111 on the top surface 110 located on the first side of the sealing member 64 in fluid communication with the inlet portion 44 of the filter port 42. The inlet aperture 111 extends from the top surface 110 to the filter inlet 18 on the inlet side of the filter media 20. The base portion 104 also has an outlet aperture 113 located on the second side of the sealing member 64 in fluid communication with the outlet portion 46 of the filter port 42. The outlet aperture 113 extends from the top surface 110 to the filter outlet 22 on the outlet side of the filter media 20.

The filter cartridge 12 has an interference member actuator 66 extending distally and substantially parallel to the longitudinal axis of the cartridge housing 94 from the distal end 98 of the cartridge housing 94. Alternatively, the interference member actuator 66 may extend from the first end cap 101, or from both the distal end 98 and the first end cap 101. The interference member actuator 66 is configured to actuate the interference member 70 from the interference position to the non-interference position when the filter cartridge 12 is inserted into the interface 14 and the filter cartridge 12 and filter port assembly 40 are rotated relative to the main housing 28 of the interface 14. The interference member 66 comprises an elongated shaft having a proximal end 118 connected to one, or both, of the distal end 98 of the cartridge housing 94 and the first end cap 101 and a distal end 120 distal to the proximal end 118. The distal end 120 has a slanted cam surface 122 which is configured to exert a force on the catch wall 84 of the interference member 70 to actuate the interference member 70 by interference member actuator 66 is moved relative to the interference member 70 via insertion and rotation of the filter cartridge 14 relative to the main housing 28.

Figures 10A, 10B:
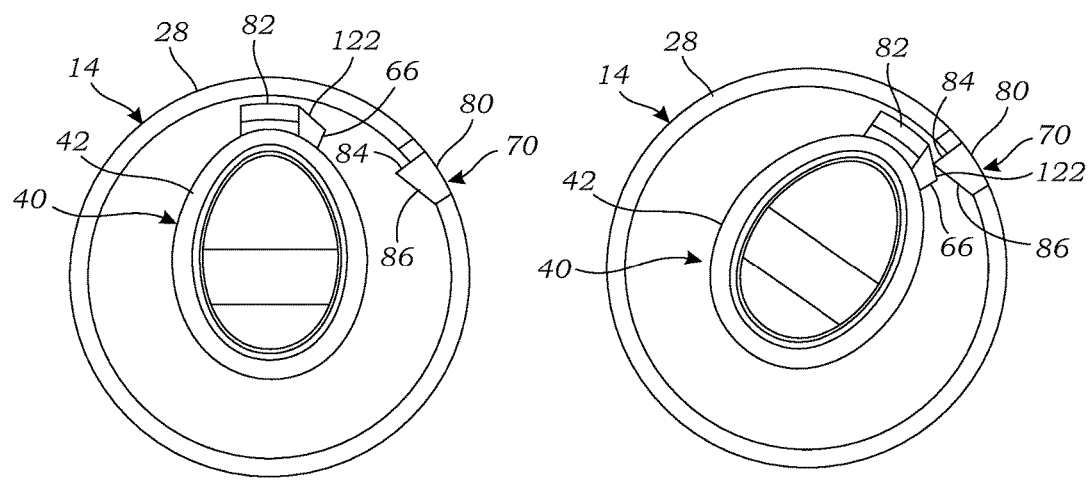
FIGS. 10A-10D are partial, top, cross-sectional views showing the operation of the interference actuator of the filter cartridge of FIG. 1 actuating the interference member of the appliance interface of FIG. 1, according to one embodiment of the present invention.

Turning to FIGS. 10A-10D, the operation of the interference member actuator 66 to actuate the interference member 70 will be described. In FIGS. 10A-10D, only the interference member actuator 66 is shown without the remainder of the filter cartridge 12, so that the it easier to see the interaction between the interference member actuator 66 and the interference member 70. FIG. 10A, shows the filter port assembly 40 and interference member actuator 66 in the bypass position (also the insertion/removal position) in which the filter cartridge 12 may be inserted into, or removed from, the interface receiver 36, and the interference member 70, and the catch 80 and catch wall 84, are in the interference position. With the interference member 70, catch 80 and catch wall 84 in the interference position, if the filter port assembly 40 is rotated clockwise without a filter cartridge 12 inserted into the interface 14, the stop 82 on the filter port assembly 40 will contact the catch wall 84 thereby preventing the filter port assembly from being rotated to the filtering position. The filter cartridge 12 is pushed distally into the interface receiver 36 such that the engagement fitting 62 is fully inserted into the filter port 42. The filter cartridge 12 and filter port assembly 40 are then rotated clockwise until the cam surface 122 contacts the catch wall 82 of the catch 80.

Figures 10C, 10D:
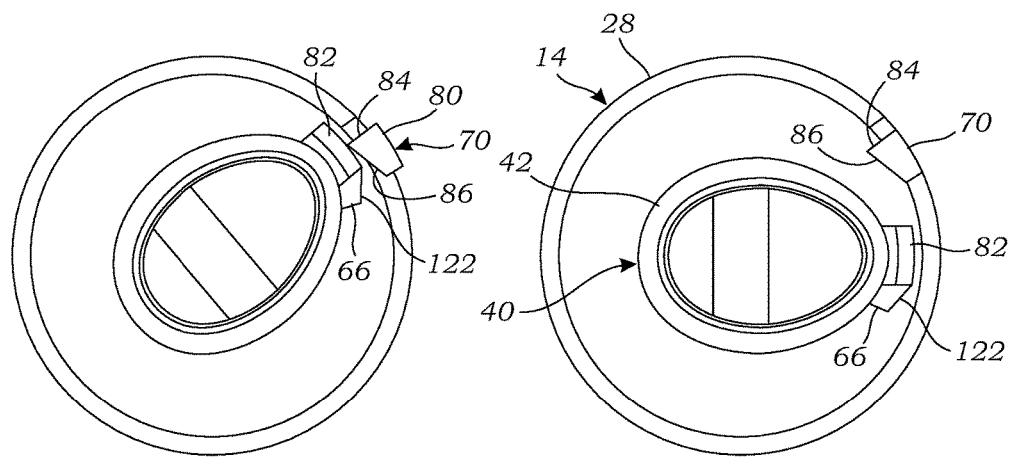

As the filter cartridge 12 and filter port assembly 40 are further rotated clockwise, as shown in FIGS. 10B-10C, the cam surface 122 pushes the catch wall 80 radially outward to the non-interference position such that the stop 82 on the filter port assembly 40 is able to move past the stop 80. As shown in FIG. 10D, once the stop 82 is rotated past the stop 80, the filter cartridge 12 and filter port assembly 40 can be further rotated clockwise to the filtering position.

The filter cartridge 12 also has a first guide slot 90a and a second guide slot 90b extending along the outer surface of the cartridge housing 94. The first guide slot 90a and second guide slot 91a have the same configuration and are located in the same axial position on the cartridge housing 94, but are angularly spaced apart around the perimeter (circumference in the case of a cylindrical cartridge housing) of the cartridge housing 94. In the described embodiment, the first guide slot 90a and second guide slot 90b are angularly spaced apart 180° from each other (i.e., located on opposite sides of the cartridge housing 94). The guide slots 90a and 90 are configured to receive the first guide 88a and second guide 88b, respectively. Each guide slot 90a, 90b has a first guide slot portion 124 that extends substantially parallel to the housing longitudinal axis and a second guide slot portion 126 that extends laterally to the housing longitudinal axis. The second guide slot portion 126 has a first end 128 that intersects with the first guide slot portion 124 and a second end 130 laterally (i.e., angularly around the perimeter of the cartridge housing 94) spaced apart from the first end 128.

The installation and operation of the fluid filter assembly 10 to replace a filter cartridge 12 installed in an appliance interface 14 will now be described. As shown in FIGS. 1, 9 and 10D, with an old filter cartridge 12 installed on the appliance interface 14 of the appliance, the cartridge housing 94 of the old filter cartridge 12 is installed in the interface receiver 36 such that the engagement fitting 62 is fully inserted into the filter port 42. The distal end of the outer edge 112 of sealing member seals against the top of the filter port 42. The filter port assembly 40 is rotated to the filter position such that the interface 14 is in the filter mode. The first guide slot 90a is positioned such that the first guide 88a is at the second end 130 of the second guide slot portion 126 of the first guide slot 90a, and the second guide slot 90b is positioned such that the second guide 88b is at the second end 130 of the second guide slot portion 126 of the second guide slot 90b. In the filter position, the inlet lumen 48a is connected to the inlet fitting 19 and the outlet lumen 48b is connected to the outlet fitting 17. In this position, fluid coming from the fluid source flows into the inlet fitting 19, into the inlet lumen 48a of the filter port assembly 40, into the inlet portion 44 of the filter port 42, into the inlet aperture 111 of the engagement fitting 42 of the filter cartridge 12, into the filter inlet 18 of the filter media 20, and then the fluid flows through the filter media 20, out through the filter outlet 22 of the filter media 20, out through the outlet aperture 113 of the engagement fitting 62, through the outlet portion 46 of the filter port 42, through the outlet 48b of the filter port assembly 40 and out through the outlet fitting 17.

To remove the currently installed old filter cartridge 12, the filter cartridge 12 is rotated in counter-clockwise such that the respective second portions 126 of the first and second guide slots 90a, 90b each follow the respective first and second guides 88a, 88b. As the filter cartridge 12 is rotated counter-clockwise, the filter port assembly 40 rotates along with the filter cartridge 12 due to the connection of the engagement fitting to the filter port 42. As the filter port assembly 40 rotates, the interface 14 transitions from the filter mode to the bypass mode. Just before the first and second guides 88a, 88b reach the first ends 128 of the second portion 126 of the respective first and second guide slots 90a, 90b (i.e., where the second portion 126 intersects with the first portion 124), the stop 82 contacts the cam wall 86 of the catch 80 thereby pushing the catch 80 radially outward which allows the stop 82 to rotate counter-clockwise past the catch 80 of the interference member 70. When the first and second guides 88a, 88b reach the respective first ends 128 of the second portions 126 of the first and second guide slot 90a, 90b (i.e., where the second portion 126 intersects with the first portion 124), the filter port assembly 40 is rotated to the bypass position in which the bypass inlet 58 of the bypass conduit 26 is connected to the inlet fitting 19 and the bypass outlet 69 of the bypass conduit 26 is connected to the outlet fitting 17. The interface 14 is now in the bypass mode. After first and second guides 88a, 88b reach the respective first ends 128 of the second portions 126 of the first and second guide slot 90a, 90b, the filter cartridge 12 is withdrawn proximally from the interface 14 such that the first and second guides 88a, 88b follow the respective first portions 124 of the first and second guide slot 90a, 90b. As the filter cartridge 12 is withdrawn, the engagement fitting 62 withdraws from the filter port 42 and the cartridge housing 94 withdraws from the interface receiver 36 until the filter cartridge 12 is fully removed from the interface 14.

A new filter cartridge 12 is installed by reversing the process described above, except that the interference member 70 is actuated by the interference member actuator 66 of the filter cartridge 12. The filter cartridge 12 is inserted into the interface 14 with the first and second guides 88a, 88b following along the respective first portions 124 of the first and second guide slots 90a, 90b. When the respective first guides 88a, 88b reach the respective second portions 126 and the filter cartridge 12 and filter port assembly 40 are then rotated such that the first and second guides 88a, 88b follow the respective second portions 126 of the first and second guide slots 90a, 90b, the interference member actuator 66 actuates the interference member 70 to the non-interference position which allows the stop 82 to move past the interference member 70 as the filter cartridge 12 and filter port assembly 40 continue to be rotated. The cam surface 122 pushes the catch wall 80 of the interference member 70 radially outward to the non-interference position such that the stop 82 on the filter port assembly 40 is able to move past the stop 80. The filter cartridge 12 and filter port assembly 40 continue to be rotated until the first and second guides 88a, 88b reach the respective second ends 130 of the first and second guide slots 90a, 90b such that the filter port assembly 40 is rotated to the filter position, and the interface 14 and the filter cartridge 12 are in the filter mode, as described above.

Although particular embodiments have been shown and described, it is to be understood that the above description is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims. For example, not all of the components described in the embodiments are necessary, and the invention may include any suitable combinations of the described components, and the general shapes and relative sizes of the components of the invention may be modified. For example, the fluid flow may be reversed such that the inlet and outlet components are reversed. In addition, even though certain components of the invention are shown as separate parts, they may be integrally formed, and vice versa, while still being distinguishable from the other components both structurally and functionally. Accordingly, embodiments are intended to exemplify alternatives, modifications, and equivalents that may fall within the scope of the claims. The invention, therefore, should not be limited, except to the following claims, and their equivalents.

What is claimed is:

1. A filter cartridge for operatively coupling to a filter interface on an appliance for installing the filter cartridge in the appliance, the filter cartridge comprising:
a cartridge housing having a first end and a second end and extending along a housing longitudinal axis through the first end and the second end;
a filter media contained within the cartridge housing between the first end and the second end;
a first end cap covering the first end of the cartridge housing;
an engagement fitting extending from the first end cap, the engagement fitting configured to be received in an interface port of the filter interface, the engagement fitting including a base portion attached to and extending from the first end cap, the base portion having a top surface opposite the first end cap, the engagement fitting also including a rectangular sealing member extending from the top surface, the base portion having an inlet aperture on the top surface located on the top surface on a first side of the sealing member, the inlet aperture in fluid communication with a filter inlet of the filter media, and an outlet aperture on the top surface located on a second side of the sealing member opposite the first side, the outlet aperture in fluid communication with a filter outlet of the filter media, the sealing member having an outer edge on a top end and two opposing side edges extending from opposing ends of the top end, and a first seal disposed along the outer edge which is configured to seal against an inside surface of the interface port when the engagement fitting is installed in the interface port; and
an interference member actuator extending axially and distally from one of the first end of the cartridge housing and the first end cap, the interference member actuator configured to actuate an interference member of the filter interface from an interference position in which a bypass conduit of the filter interface is engaged and the filter cartridge is prevented from being fully inserted into the filter interface to a non-interference position in which the bypass conduit is disengaged and the filter cartridge is allowed to be fully inserted into the filter interface.

2. The filter cartridge of claim 1, wherein the interference member actuator comprises an elongated shaft having a first end connected to the first end of the cartridge housing, a second end distal to the first end, and a slanted cam surface disposed on the second end, the slanted cam surface configured to exert a force on the interference member to actuate the interference member when the slanted cam surface is moved relative to the interference member.

3. The filter cartridge of claim 1, further comprising:
a first guide slot extending along an outer surface of the cartridge housing, the first guide slot configured to receive a first guide disposed on an interior wall of a chamber of the interface filter configured to receive the cartridge housing.

4. The filter cartridge of claim 3, wherein the first guide slot includes a first portion that extends substantially parallel to the housing longitudinal axis and a second portion that extends laterally to the housing longitudinal axis.

5. The filter cartridge of claim 4, wherein the second portion extends circumferentially about the cartridge housing.

6. The filter cartridge of claim 3, further comprising:
a second guide slot extending along an outer surface of the cartridge housing, the second guide slot configured to receive a second guide disposed on the interior wall of the chamber of the filter interface.

7. The filter cartridge of claim 1, wherein the outer edge of the sealing member has a seal groove, and the first seal is disposed in the seal groove.

8. The filter cartridge of claim 1, further comprising:
a base seal disposed around the entire perimeter of the base portion, the base seal configured to seal against an inside surface of the interface port when the engagement fitting is installed in the interface port.

9. The filter cartridge of claim 8, wherein the first seal and the base seal are a single, contiguous seal.

10. The filter cartridge of claim 1, wherein the base portion has a cross-section that is substantially egg-shaped.

11. The filter cartridge of claim 1, wherein the base portion and the first end cap are integrally formed.

12. A filter cartridge for operatively coupling to a filter interface on an appliance for installing the filter cartridge in the appliance, the filter cartridge comprising:
a cartridge housing having a first end and a second end and extending along a housing longitudinal axis through the first end and the second end;
a filter media contained within the cartridge housing between the first end and the second end;
a first end cap covering the first end of the cartridge housing;
an engagement fitting extending from the first end cap, the engagement fitting configured to be received in an interface port of the filter interface which is rotatable relative to a main body of the filter interface, the engagement fitting including a base portion attached to and extending from the first end cap, the base portion having a bottom surface attached to the first end cap and a top surface opposite the bottom surface, the engagement fitting also including a rectangular sealing member extending from the top surface, the base portion having an inlet aperture located on a first side of the sealing member, and an outlet aperture located on a second side of the sealing member opposite the first side, the sealing member having an outer edge on a top end and two opposing side edges extending from opposing ends of the top end, and a first seal disposed along the outer edge which is configured to seal against an inside surface of the interface port when the engagement fitting is installed in the interface port; and
an interference member actuator extending axially and distally from one of the first end of the cartridge housing and the first end cap, the interference member actuator configured to actuate an interference member of the filter interface form an interference position in which the interface port is prevented from being rotated past a stop position wherein a bypass conduit of the interface port is engaged, to a non-interference position in which the interface port can be rotated past the stop position and the bypass conduit is disengaged.

13. The filter cartridge of claim 12, wherein the interference member actuator comprises an elongated shaft having a first end connected to the first end of the cartridge housing, a second end distal to the first end, and a slanted cam surface disposed on the second end, the slanted cam surface configured to exert a force on the interference member to actuate the interference member when the slanted cam surface is moved relative to the interference member.

14. The filter cartridge of claim 12, further comprising:
a first guide slot extending along an outer surface of the cartridge housing, the first guide slot configured to receive a first guide disposed on an interior wall of a chamber of the filter interface configured to receive the cartridge housing.

15. The filter cartridge of claim 14, wherein the first guide slot includes a first portion that extends substantially parallel to the housing longitudinal axis and a second portion that extends laterally to the housing longitudinal axis.

16. The filter cartridge of claim 15, wherein the second portion extends circumferentially about the cartridge housing.

17. The filter cartridge of claim 14, further comprising:
a second guide slot extending along an outer surface of the cartridge housing, the first guide slot configured to receive a second guide disposed on the interior wall of the chamber of the filter interface.

18. The filter cartridge of claim 12, wherein the outer edge of the sealing member has a seal groove, and the first seal is disposed in the seal groove.

19. The filter cartridge of claim 12, further comprising:
a base seal disposed around the entire perimeter of the base portion, the base seal configured to seal against an inside surface of the interface port when the engagement fitting is installed in the interface port.

20. The filter cartridge of claim 19, wherein the first seal and the base seal are a single, contiguous seal.

* * * * *